US006442287B1

(12) United States Patent
Jiang et al.

(10) Patent No.: US 6,442,287 B1
(45) Date of Patent: *Aug. 27, 2002

(54) METHOD AND SYSTEM FOR THE COMPUTERIZED ANALYSIS OF BONE MASS AND STRUCTURE

(75) Inventors: Chunsheng Jiang, Naperville; Michael R. Chinander, Chicago; Maryellen L. Giger, Elmhurst, all of IL (US)

(73) Assignee: Arch Development Corporation, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,535

(22) Filed: Aug. 28, 1998

(51) Int. Cl.$^7$ .............................. G06K 9/00; G06K 9/62; A61B 10/00

(52) U.S. Cl. ...................... 382/128; 382/156; 600/562

(58) Field of Search ................................ 382/128, 132, 382/156; 378/53, 54, 56; 600/562, 407, 408, 425

(56) References Cited

U.S. PATENT DOCUMENTS

| | | | |
|---|---|---|---|
| 4,922,915 A | * 5/1990 | Arnold et al. | 382/128 |
| 5,348,009 A | 9/1994 | Ohtomo et al. | 600/407 |
| 5,602,935 A | * 2/1997 | Yoshida et al. | 382/132 |
| 5,745,544 A | * 4/1998 | Mazess | 378/56 |
| 5,772,592 A | 6/1998 | Cheng et al. | 600/407 |
| 5,910,972 A | * 6/1999 | Ohkubo et al. | 378/54 |
| 5,915,036 A | * 6/1999 | Grunkin et al. | 382/132 |
| 5,931,795 A | * 8/1999 | Manly et al. | 600/587 |

OTHER PUBLICATIONS

Kotahri et al, Impact of Spatial Resolution on the Prediction of Trabecular Architecture Parameters, Elsevier Sciencs Inc. (Bone), ISBN: 8756–3282198, May 1998, vol. 22, No. 5, pp. 437–443.*

Majumdar et al, "Evaluation of Technical Factors Affecting the Quantification of Trabecular Bone Structure Using Magnetic Resonance Imaging", Oct. 1995, Elsevier Sciences Inc. (Bone), ISBN: 8756–8232/95, vol. 17, No. 4, pp. 417–430.*

(List continued on next page.)

*Primary Examiner*—Amelia M. Au
*Assistant Examiner*—Mehrdad Dastouri
(74) *Attorney, Agent, or Firm*—Oblon, Spivak, McClelland, Maier & Neustadt, P.C.

(57) ABSTRACT

An automated method, storage medium, and system for analyzing bone. Digital image data corresponding to an image of the bone are obtained. Next there is determined, based on the digital images, a measure of bone mineral density (BMD) and at least one of a measure of bone geometry, a Minkowski dimension, and a trabecular orientation. The strength of the bone is estimated based upon the measure of BMD and at least one of the measure of bone geometry, the Minkowski dimension, and the trabecular orientation. To improve bone texture analysis, the present invention also provides a novel automated method, storage medium, and system in which digital image data corresponding to an image of the bone is obtained, and a region of interest (ROI) is selected within the bone. A fractal characteristic of the image data within the ROI using an artificial neural network is extracted. The strength of the bone is estimated based at least in part on the extracted fractal characteristic. To perform bone analysis with an improved measure of bone mineral density, the present invention also provides a novel automated method, storage medium, and system in which digital image data corresponding to an image of the bone is obtained. A measure of normalized bone mineral density (BMD) corresponding to a volumetric bone mineral density of the bone is determined, and the strength of the bone based is estimated based at least in part on the normalized BMD.

54 Claims, 28 Drawing Sheets

OTHER PUBLICATIONS

Simmons et al, "MORPH– Analysis of 3D Trabecular Bone Morphology", 1997, Bone and Mineral Research Journal, 2 pages.*

Chen et al, "Fractal Analysis of Travecular Patterns in Projection Radiographs, An Assessment,"; Investigative Radiology, vol. 29, No. 6, pp. 624–629, Jun. 1994.*

Keaveny et al., "Differences between the Tensile and Compressive Strengths of Bovine tibial Trabecular Bone Depend on Modulus,"; Journal of Biomechanics, vol. 27, No. 9, pp. 1137–1146, Sep. 1994.*

Jarvi et al., "characterization of radiographic Trabecular Bone Structure with Gabor Wavelets,"; Proceedings of SPIE, vol. 3034, pp. 671–680, Jan. 1997.*

Fractal Signal Analysis Using Mathematical Morphology, Petros Margos; Advances in Electronics And Electron Physics, vol. 88, pp. 199–246, 1994.*

Quantatitive Computer Assisted Tomography (QCT) and Mechanical Properties of Cancellous Bone, Lorio et al; IEEE Proceedings in Biomedical Engineering Conference; ISBN: 0–7803–0976–6, pp. 242–244, Apr. 1993.*

* cited by examiner

METHOD AND SYSTEM FOR THE COMPUTERIZED ANALYSIS OF BONE MASS AND STRUCTURE

The present invention was made in part with U.S. Government support under grant numbers. This study was supported in parts by USPHS Grants RO1 AR42739 and T32 CA09649. The U.S. Government has certain rights in this invention.

BACKGROUND OF THE INVENTION

1. Field of the Invention:

The invention relates generally to a method and system for the computerized analysis of bone mass and structure. Specific applications are given for the analysis of the trabecular mass and bone pattern for the assessment of bone strength and/or osteoporosis and as a predictor of risk of fracture. Novel techniques involve the merging of various features including those related to bone mass, bone geometry, bone structural information, and subject's age. Additional techniques include the application of Minkowski Dimension and an artificial neural network to aid in the computerized fractal analysis of the bone structure. In addition, an estimate of the volumetric BMD is presented incorporating bone mass and bone geometry.

The present invention generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; and 5,740,268; as well as U.S. patent application Ser. Nos. 08/158,388; 08/173,935; 08/220,917; 08/398,307; 08/428,867; 08/523,210; 08/536,149; 08/536,450; 08/515,798; 08/562,087; 08/757,611; 08/758,438; 08/900,191; 08/900,361; 08/900,362; 08/900,188; and 08/900,189, 08/900,192; 08/979,623; 08/979,639; 08/982,282; 09/027,468; 09/027,685; 09/028,518; 09/053,798; 09/092,004; 09/098,504; 09/121,719; and 09/131,162 all of which are incorporated herein by reference.

The present invention includes use of various technologies referenced and described in the above-noted U.S. Patents and Applications, as well as described in the references identified in the appended APPENDIX and cross-referenced throughout the specification by reference to the number, in brackets and bold print, of the respective reference listed in the APPENDIX, the entire contents of which, including the related patents and applications listed above and references listed in the APPENDIX, are incorporated herein by reference.

2. Discussion of the Background:

Although there are many factors that affect bone quality, two primary determinants of bone mechanical properties are bone mineral density (BMD) and bone structure. Among the density and structural features extracted from bone using various techniques, researchers agree that BMD is the single most important predictor of bone strength as well as disease-conditions such as osteoporosis. Studies have shown correlation between BMD and bone strength (Carter and Haye, 1977 [4]; Beck et al., 1989 [2]; Keaveny and Hayes, 1993 [9]). To this purpose, a range of techniques have been developed to measure BMD to evaluate fracture risk, diagnose osteoporosis, monitor therapy of osteoporosis, and predict bone strength (Beck et al., 1989 [2]; Ross et al., 1990 [14]; Adams, 1997 [1]; Grampp et al., 1997 [7]).

The standard technique for noninvasive evaluation of bone mineral status is bone densitometry. Among various techniques for bone densitometric measurement, dual energy X-ray absorptiometry (DXA) is relatively inexpensive, low in radiation dose (<5 $\mu$Sv effective dose equivalent), and of high accuracy ($\approx$1%) and precision ($\approx$1%) (Sartoris and Resnick, 1990 [15]; Adams, 1997 [1]; Lang, 1998 [10]). DXA has gained widespread clinical acceptance for the routine diagnosis and monitoring of osteoporosis (Adams, 1997 [1]). In addition, DXA can be directly used to measure whole bone geometric features (Faulkner et al., 1994 [6]; Sieranen et al., 1994 [17]; Karlsson et al., 1996 [8]; Lang, 1998 [10]). The BMD measurement from DXA, however, is only moderately correlated to bone mechanical properties and has limited power in separating the patients with and without osteoporosis-associated fractures (Cann et al., 1985 [3]). DXA provides an integral measure of cortical and trabecular bone mineral content along the X-ray path for a given projected area, but DXA only measures bone mass, not bone structure. As a consequence, DXA measurements are bone-size dependent and yield only bone mineral density per unit area (g/cm$^2$) instead of true density, i.e., volumetric bone mineral density (g/cm$^3$). Therefore, if the BMD measurements of patients with different bone sizes are compared, the results can be misleading.

Although the effect of bone size on area BMD using DXA is apparent (Carter et al., 1992 [5]; Seeman, 1998 [16]), only a few studies (Nielesn et al., 1980 [13]; Martin and Buff, 1984 [11]; Carter et al., 1992 [5]) have been performed to account for such a bias. To compensate for the effect of bone size for vertebral bodies, Carter et al. (1992) [5] developed an analysis method and suggested a new parameter, bone mineral apparent density (BMAD), as a measure of volumetric bone mineral density.

Also, one of the functions of bone is to resist mechanical failure such as fracture and permanent deformation. Therefore, biomechanical properties are fundamental measures of bone quality. The biomechanical properties of trabecular bone are primarily determined by its intrinsic material properties and the macroscopic structural properties (Cowin et al., 1987 [24]; Chakkalakl et al., 1990 [23]; Brandenburger, 1990 [21]; Keaveny and Hayes, 1993 [9]). Extensive efforts have been made toward the evaluation of bone mechanical properties by studying bone mineral density (BMD) and mineral distribution.

Since bone structural rigidity is derived primarily from its mineral content (Elliott et al., 1989 [27]), most evaluation methods have been developed to measure bone mass (mineral content or density) and to relate these measures to bone mechanical properties (Carter and Haye, 1977 [4]; Bentzen et al., 1987 [20]; Hvid et al., 1989 [32]; Keaveny and Hayes, 1993 [9]; Keaveny et al., 1994 [36]). Results from in vivo and in vitro studies suggest that BMD measurements are only moderately correlated to bone strength (Carter et al., 1992 [5]). However, studies have shown changes in bone mechanical properties and structure independent of BMD (Goldstein, 1987 [30]; Faulkner et al., 1991 [28]). Moreover, because density is an average measurement of bone mineral content within bone specimens, density does not include information about bone architecture or structure.

Various methods have been developed for in vitro study of two- or three-dimensional architecture of trabecular bones using histological and stereological analyses (Whitehouse, 1974 [31]; Feldkamp et al., 1989 [29]; Goulet et al., 1994 [31]; Croucher et al., 1996 [25]). These studies have shown that, by combining structural features with bone density, about 72 to 94 percent of the variability in mechanically measured Young's moduli could be explained. However, these measurements are. invasive.

For the noninvasive examination of trabecular bone structure, investigators have developed high-resolution computed tomography (CT) and magnetic resonance imaging (MRI) (Feldkamp et al., 1989 [29]; Durand and Ruegsegger, 1992 [26]; Majumder et al., 1998 [38]). However, due to cost and/or other technical difficulties, these techniques are currently not in routine clinical use. The potential of using X-ray radiographs to characterize trabecular bone structure has also been studied. Although the appearance of trabecular structure on a radiograph is very complex, studies have suggested that fractal analysis may yield a sensitive descriptor to characterize trabecular structure from x-ray radiographs both in in vitro studies (Majumdar et al, 1993 [37]; Benhamou et al., 1994 [19]; Acharya et al., 1995 [18]; Jiang et al., 1998a [33]) and in an in vivo study (Caligiuri et al., 1993 [22]).

Different methods, however, exist with which to compute fractal dimension. Minkowski dimension, a class of fractal dimension that is identical to Hausdroff dimension (Mandelbrot, 1982 [39]), is particularly suitable for analyzing the complex texture of digital images because it can be formally defined through mathematical morphology and easily computed using morphological operations (Serra, 1982 [42]; Maragos, 1994 [40]). The Minkowski dimension computed from an image, regardless of texture orientation, gives a global dimension that characterizes the overall roughness of image texture. Similarly, the Minkowski dimensions computed from different orientations yield directional dimensions that can be used to characterize the textural anisotropy of an image (Jiang et al., 1998a [33]).

SUMMARY OF THE INVENTION

Accordingly, an object of this invention is to provide a method and system for the computerized analysis of bone mass and/or structure.

Another object of this invention is to provide a method and system for estimating bone strength.

Another object of this invention is to provide a method and system for estimating a volumetric bone mass measure using bone geometry.

Another object of this invention is to provide a method and system for incorporating Minkowski Dimension into the analysis of the bone structure pattern.

Another object of this invention is to provide a method and system for extracting information from fractal-based texture analyses.

Another object of this invention is to provide a method and system for merging information on bone mass, bone geometry, bone structure and/or subject age in order to obtain measures of bone strength.

These and other objects are achieved according to the invention by providing a novel automated method, storage medium storing a program for performing the steps of the method, and system in which digital image data corresponding to an image of the bone are obtained. Next there is determined, based on the digital images, a measure of bone mineral density (BMD) and at least one of a measure of bone geometry, a Minkowski dimension, a trabecular orientation, and subject data. The strength of the bone is estimated based upon the measure of BMD and at least one of the measure of bone geometery, the Minkowski dimension, the trabecular orientation, and the subject data. Preferably, a normalized BMD corresponding to a volumetric bone mineral density of the bone as the measure of BMD is determined, and the strength of the bone is estimated based at least in part on the normalized BMD.

To improve bone texture analysis, the present invention also provides a novel automated method, storage medium storing a program for performing the steps of the method, and system in which digital image data corresponding to an image of the bone is obtained, and a region of interest (ROI) is selected within the bone. A fractal characteristic of the image data within the ROI using an artificial neural network is extracted. The strength of the bone is estimated based at least in part on the extracted fractal characteristic.

To perform bone analysis with an improved measure of bone mineral density, the present invention also provides a novel automated method, storage medium storing a program for performing the steps of the method, and system in which digital image data corresponding to an image of the bone is obtained. A measure of normalized bone mineral density (BMD) corresponding to a volumetric bone mineral density of the bone is determined, and the strength of the bone based is estimated based at least in part on the normalized BMD.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
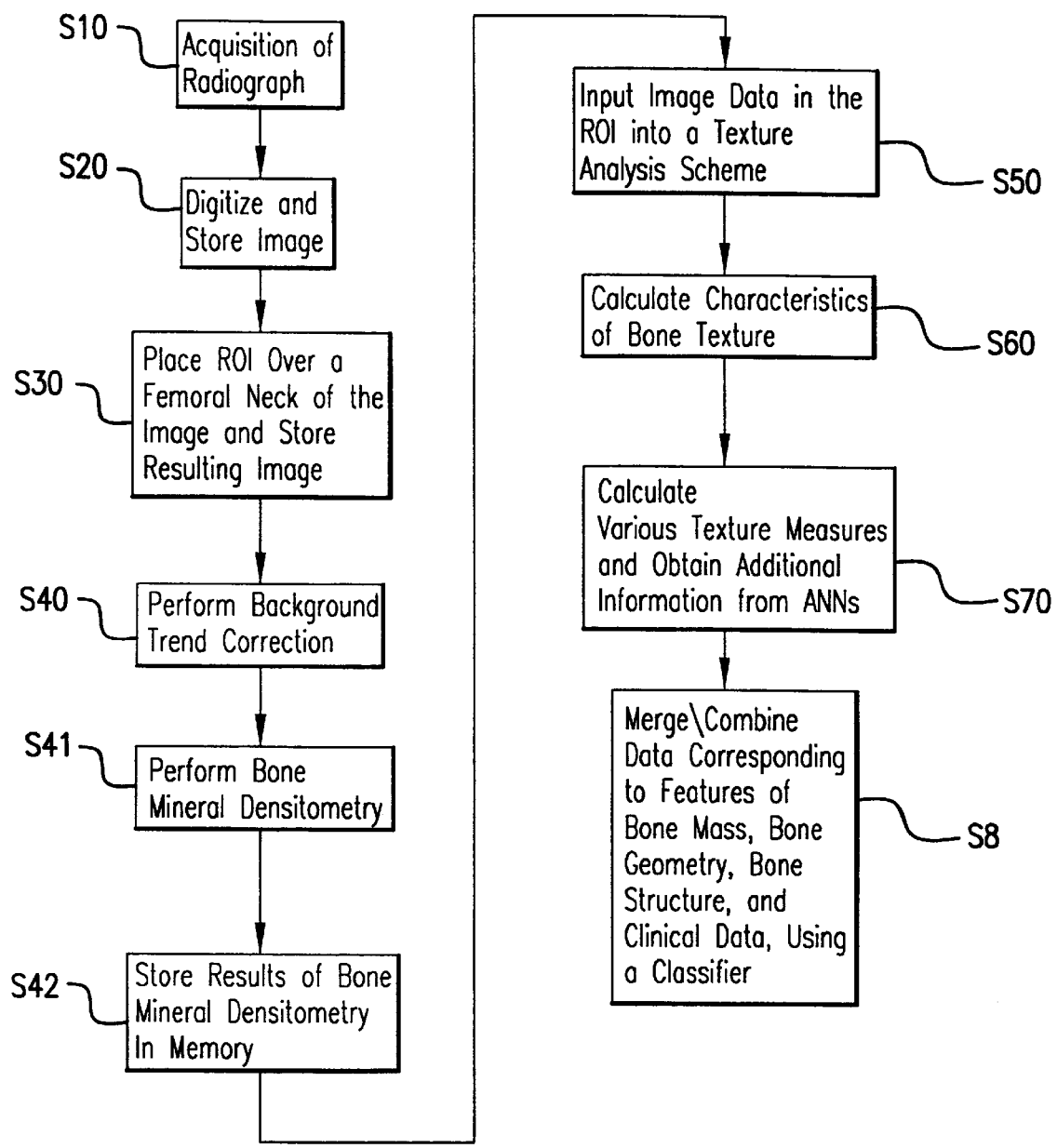
FIG. 1(a) is a flowchart of the inventive method for analyzing bone mass and structure.
Figure 1B:
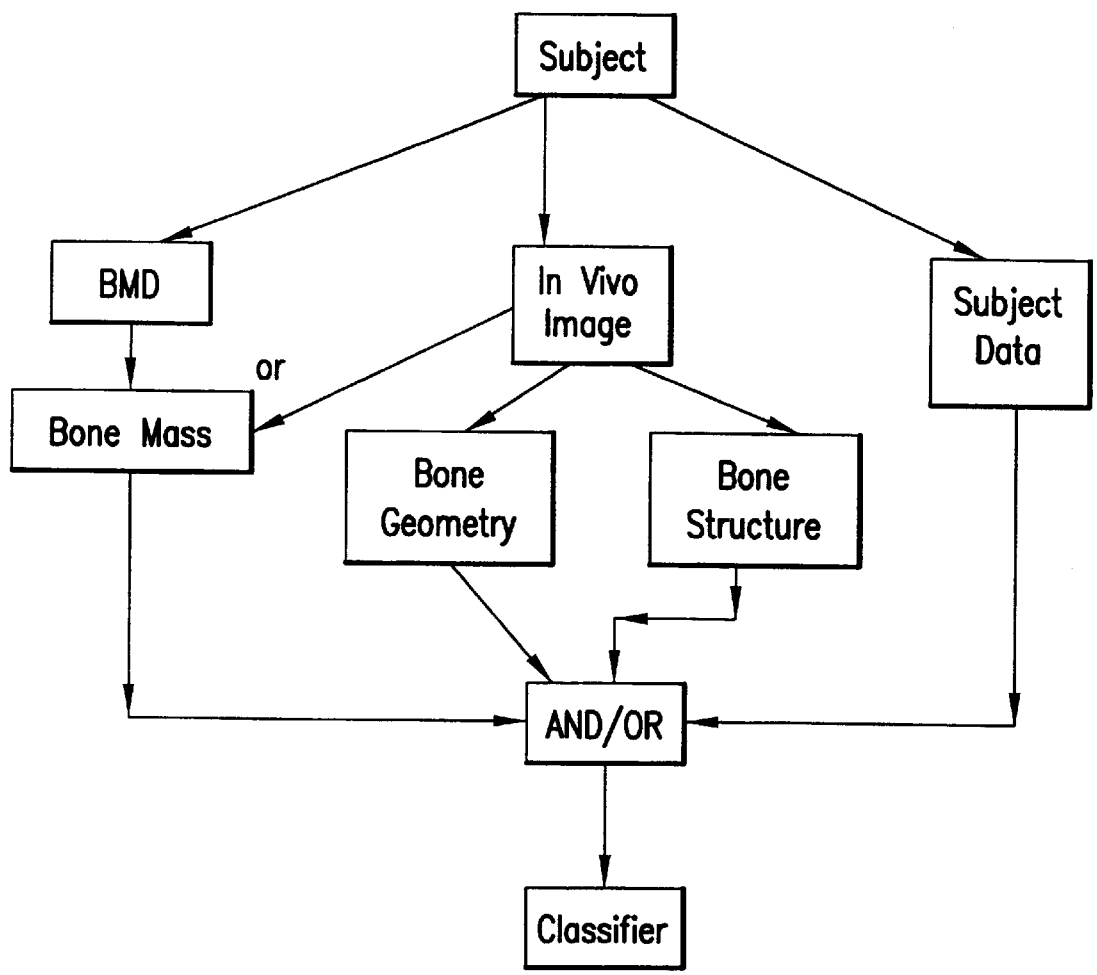
FIG. 1(b) is a schematic showing how the present invention combines various types of data to analyze bone mass, bone geometry, and/or structure.

Referring now to the drawings, and more particularly to FIG. 1(a) thereof, a flowchart describing an inventive method for the analysis of bone is shown. FIG. 1(b) is a schematic showing how the present invention incorporates various types of data to analyze bone mass, bone geometry, and/or structure.

With the inventive method described in FIG. 1(a), the characteristics of the bone, geometry, and trabecular pattern are extracted using computer analysis of image data from digital images of bony parts of the body such as the hip. The overall scheme includes an initial acquisition of a radiographic image of the hip in step S10. The image is digitized and stored in memory in step S20. Alternatively, steps S10 and S20 may be combined into a single step by directly acquiring a digital radiographic image of the hip. A region of interest (ROI) is then placed over a femoral neck on the image and the corresponding image data are stored in memory in step S30. Background trend correction is performed in step S40 to yield the underlying fluctuations, i.e., the trabecular pattern, in the bone. In step S41 bone mineral densitometry, including BMD, is also performed on the bone. Then, in step S42 the results of bone mineral densitometry are stored in memory. Next, in step S50 the image data in the ROI are then input to a texture analysis scheme, and then, in step S60 characteristics of the bone texture are calculated. In step S70 various texture measures are calculated using texture schemes such as Minkowski Dimension, and additional information is obtained from the use of artificial neural networks (ANNs).

The image data in memory (from step S20) is also used to extract bone geometry yielding such features as femoral neck thickness and femoral shaft thickness. These features can also be used to normalize BMD and to yield an estimate of volumetric BMD. In step S80 data corresponding to the features of bone mass, bone geometry, bone structure, and clinical data (e.g., the subject's age) are merged/combined using one or more classifiers such as a linear discriminant function and/or an artificial neural network (ANN) to yield an estimate of bone strength and thus the likelihood of risk of future fracture.

Figure 22:
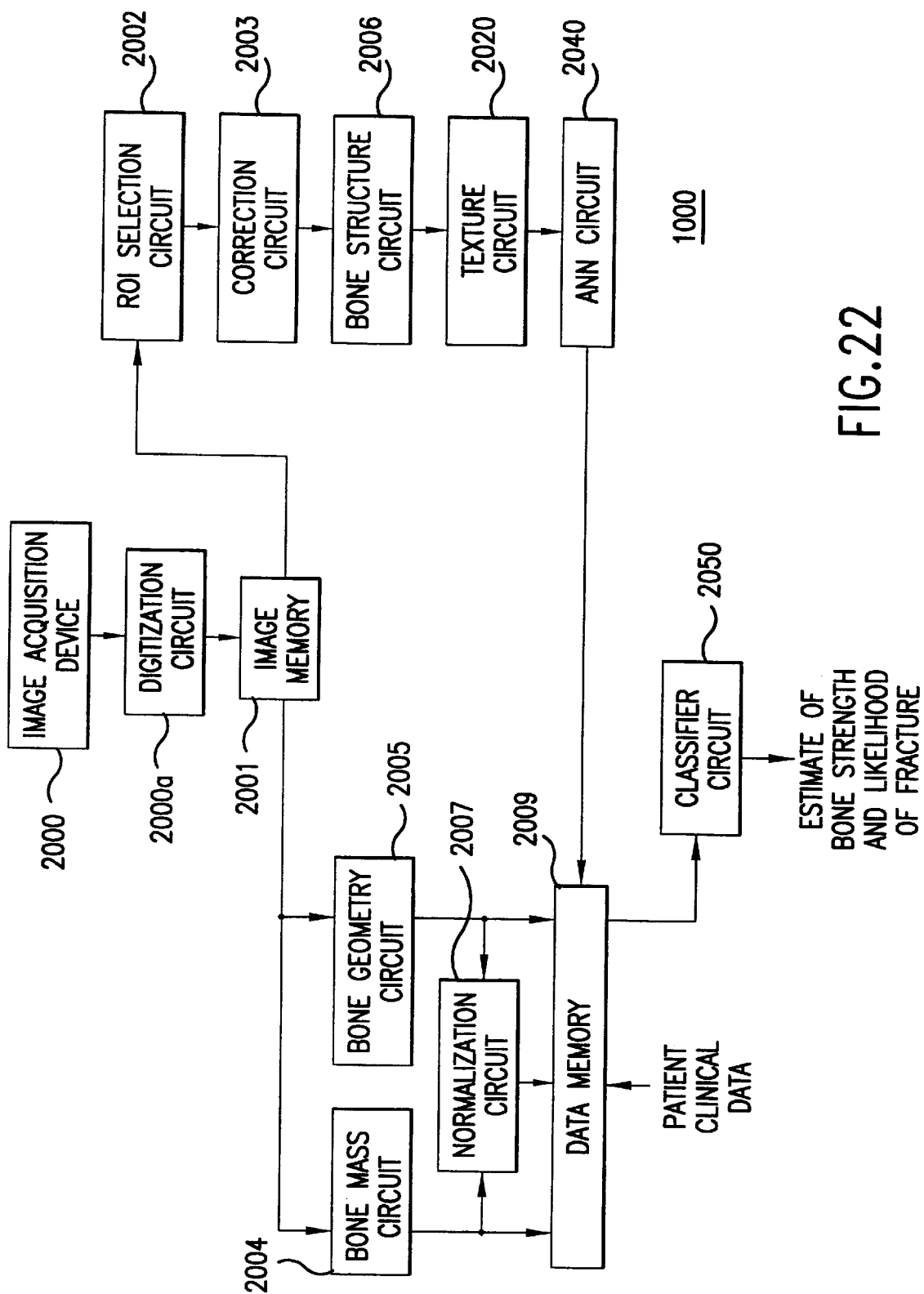
FIG. 22 is a block diagram of a system for implementing the inventive method.

FIG. 22 is a block diagram illustrating a system 1000 for implementing the inventive method for analysis of bone mass and bone trabecular structure. The method and the hardware used to implement the method and system 1000 are discussed in greater detail below under the various section headings that follow the description of FIG. 22.

Referring to FIG. 22, an image acquisition device 2000 inputs a radiographic image of an object into a digitization circuit 2000a. An image memory 2001 stores the digitized image. If the radiographic image is obtained with a direct digital device, then there is no need for the digitization circuit 2000a. The image memory 2001 sends stored images to an ROI selection circuit 2002 for placing ROIs on images. The ROI selection circuit sends images with ROIs to a nonlinear detection system correction circuit 2003 for performing background trend correction. The nonlinear detection system correction circuit 2003 sends image data, for which background trend correction has been performed, to a bone structure circuit 2006 for determining structural features of bone (including the trabecular orientation) represented by the image data. The bone structure circuit sends the extracted structural features to a texture circuit 2020 which generates texture information including the Minkowski dimension. An ANN fractal measure circuit 2040 determines, among other things, the fractal nature of the bone texture information generated in the texture circuit 2020.

The image memory 2001 also sends stored image data to a bone mass circuit 2004 for calculating BMD. Additionally, the image memory 2001 sends stored image data to a bone geometry circuit 2005 for calculating various measures of bone geometry including femoral neck width and femoral shaft width. A normalization circuit 2007 calculates the normalized BMD based on the BMD and the bone geometry information generated in the bone mass circuit 2004 and bone geometry circuit 2005, respectively. The normalized BMD provides an estimate of the volumetric bone mineral density.

A data memory 2009 stores data regarding BMD, normalized BMD, bone geometry, and the fractal nature of the bone texture. This data may be weighted in a weighted sum circuit (not shown) before being stored in the data memory 2009. Patient clinical data is also input and stored in the data memory 2009.

A classifier circuit 2050 estimates bone strength (and thus the likelihood for risk of future fracture) based on the measures of bone mass, bone geometry, bone structure, and/or patient data. An image memory (now shown) stores any image data generated by the various components of the system. A display system (for example, the monitor 302 in FIG. 23, discussed later) converts the digital image data generated by the system's components into analog data and displays the resulting images. A superimposing circuit (not shown) superimposes the results of the system's calculations onto the displayed images, stores the results in file format, or provides the results in a text-only format.

Database

Figure 2A:
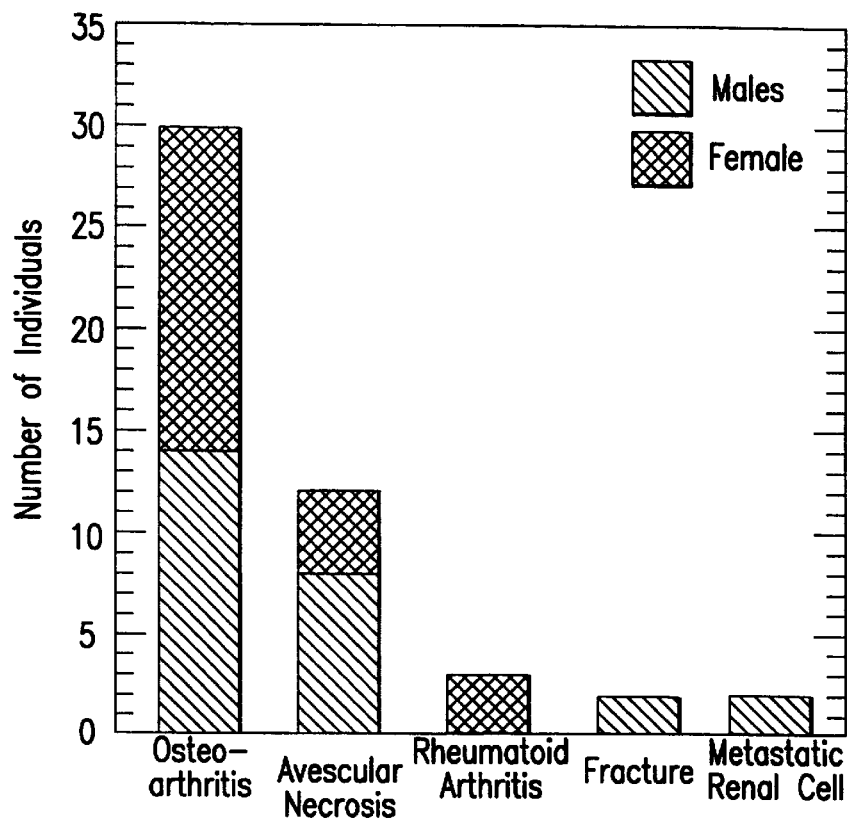
FIG. 2(a) is a histogram showing the distribution, in an exemplary database, of diseases leading to total hip arthroplasty.

FIG. 2(a) is a graph showing the distribution of diseases in a database on which the present invention was tested. The database included femoral neck specimens. The specimens were excised from patients undergoing total hip arthroplasties. The ages ranged from twenty to ninety-four years with a mean age of fifty-eight years. Each patient case also contained a standard pre-operative pelvis radiograph. The clinical findings necessitating hip replacement for the individuals included osteoarthritis (n=30), avascular necrosis (n=12), and rheumatoid arthritis (n=2). Since many of the specimens were obtained from individuals with joint disease, rather than bone disease, the strengths of the bone ranged from very strong to very weak. The range of ages of the individuals from which the specimens were obtained was 20–94 years with a median age of 63 years and an average age of 59 years. The wide range in age yielded a large variation in bone mechanical properties.

Figure 2B:
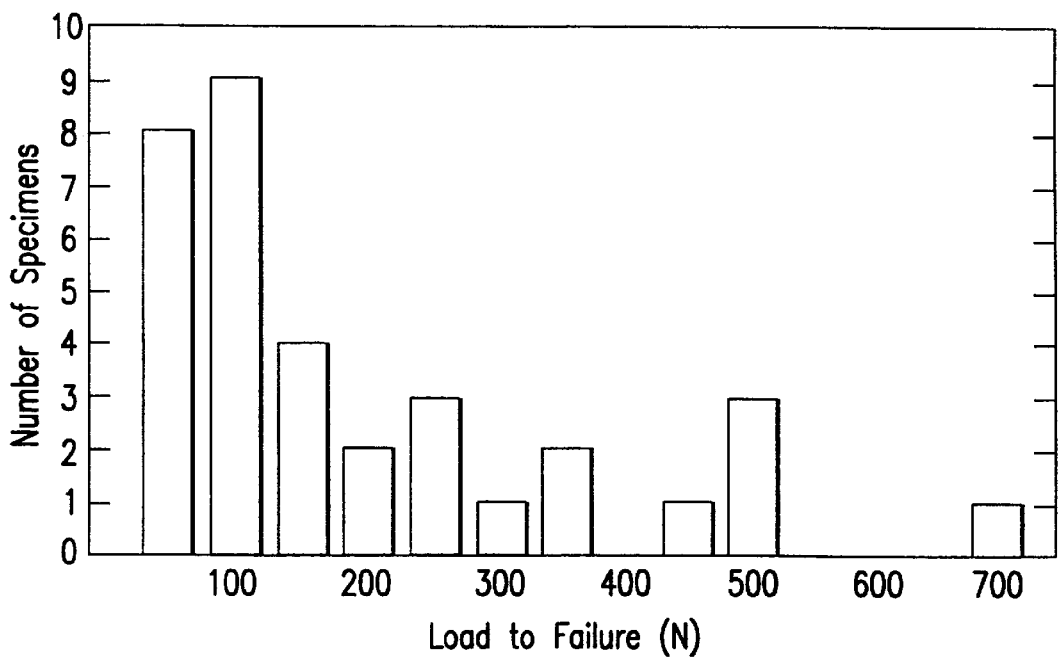
FIG. 2(b) is a histogram showing the distribution of cases in the exemplary database in terms of bone strength.

FIG. 2(b) is a histogram showing the distribution of cases in the exemplary database in terms of bone strength.

Bone mineral density and bone radiography

The overall method for calculation of volumetric BMD includes conventional area-based BMD from DXA and the extraction of geometric measures from pelvic radiographs. Area-based BMD was performed on each femoral neck specimen. Each femoral neck specimen was positioned in a Styrofoam cup by an orthopedic surgeon to match the angulation and anteversion presented on the standard pelvis radiograph of the patient. LUCITE with a thickness of five centimeters was added below each specimen to simulate the soft tissue in clinical BMD measurements. A Lunar DPX-IQ (Lunar Corp., Madison Wis.) densitometer was used to scan each specimen. After a specimen was scanned, a region of interest (ROI) was identified, and the area BMD (g/cm$^2$) within the ROI in the anteriorposterior direction was obtained using the analysis software available on the Lunar DPX system. Each of the ROIs was selected to match the site from where the trabecular bone cubes would be machined from the femoral neck specimen for mechanical testing (discussed below).

Figure 3A:
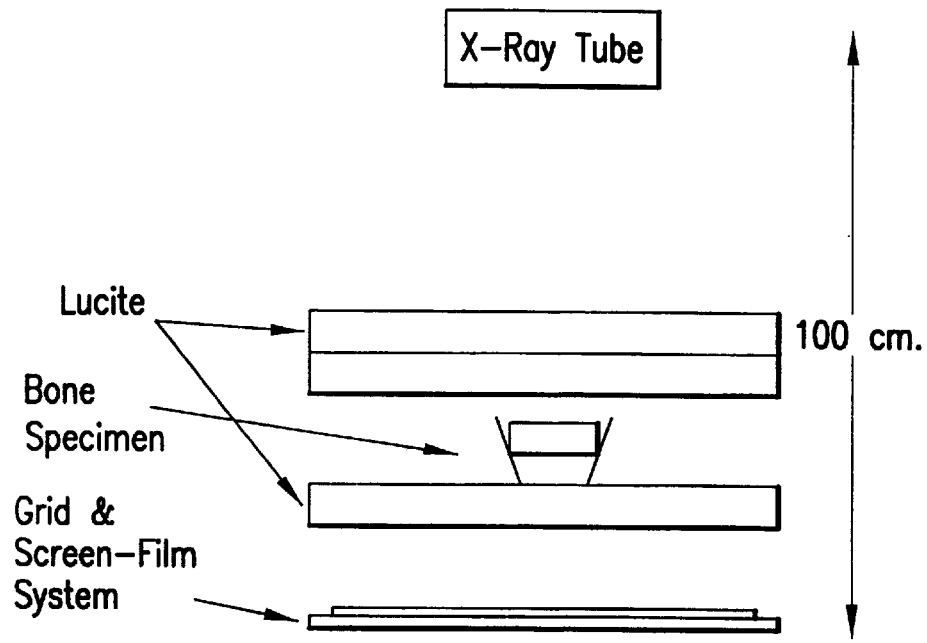
FIGS. 3(a) and 3(b) are schematic diagrams that show the setups used to radiograph the femoral neck specimens, wherein the setup in FIG. 3(a) simulates the femoral neck as it would appear in a clinical hip radiograph, and the setup in FIG. 3(b) was used to produce a it high-resolution radiograph of the specimens.
Figure 3B:
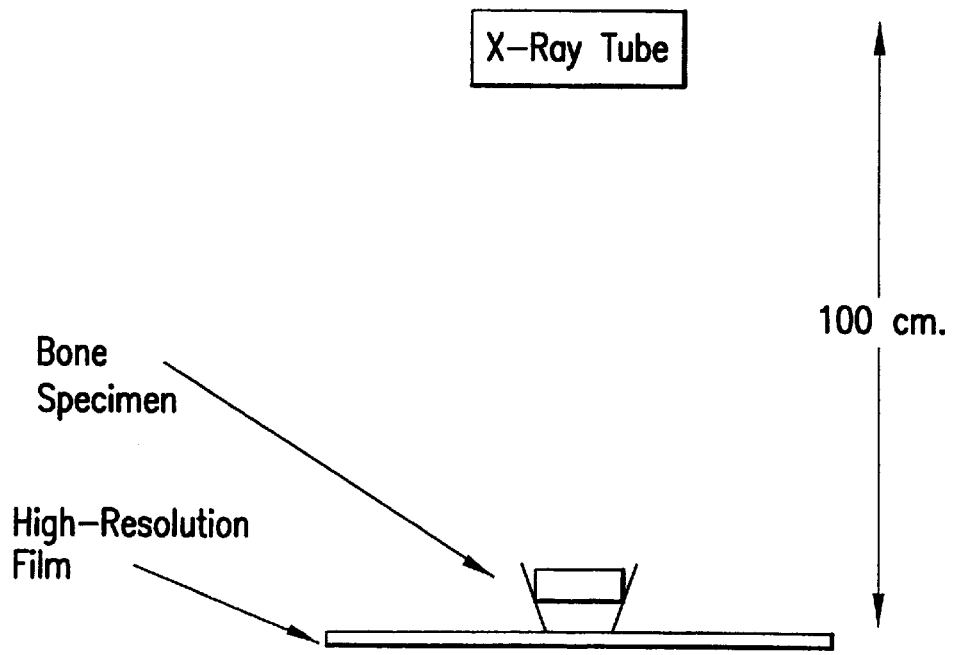
Figure 4A:
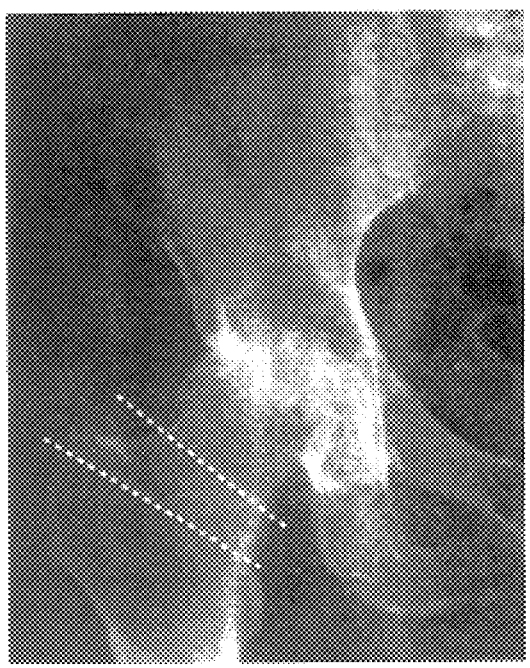
FIG. 4(a), FIG. 4(b), and FIG. 4(c) are respective images of (a) a pre-operative film, (b) a specimen film using the "simulated clinical" setup, and (c) a specimen film using the "verification" setup, wherein the regions-of-interest shown in FIG. 4(b) and FIG. 4(c) are the regions from which the texture measures are calculated.
Figure 4B:
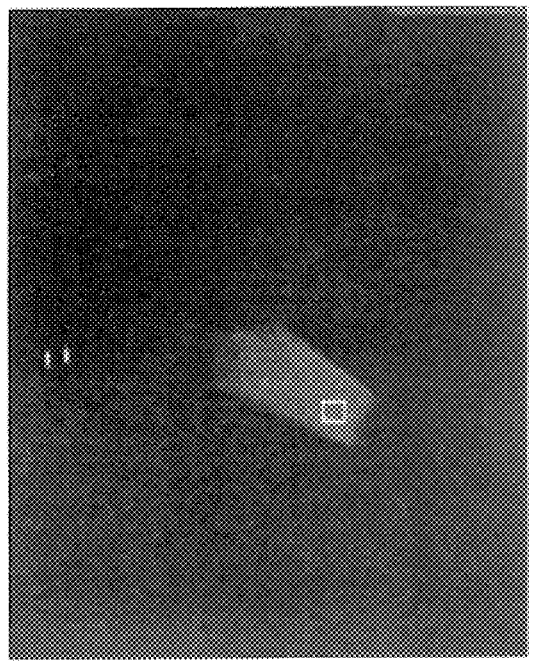
Figure 4C:
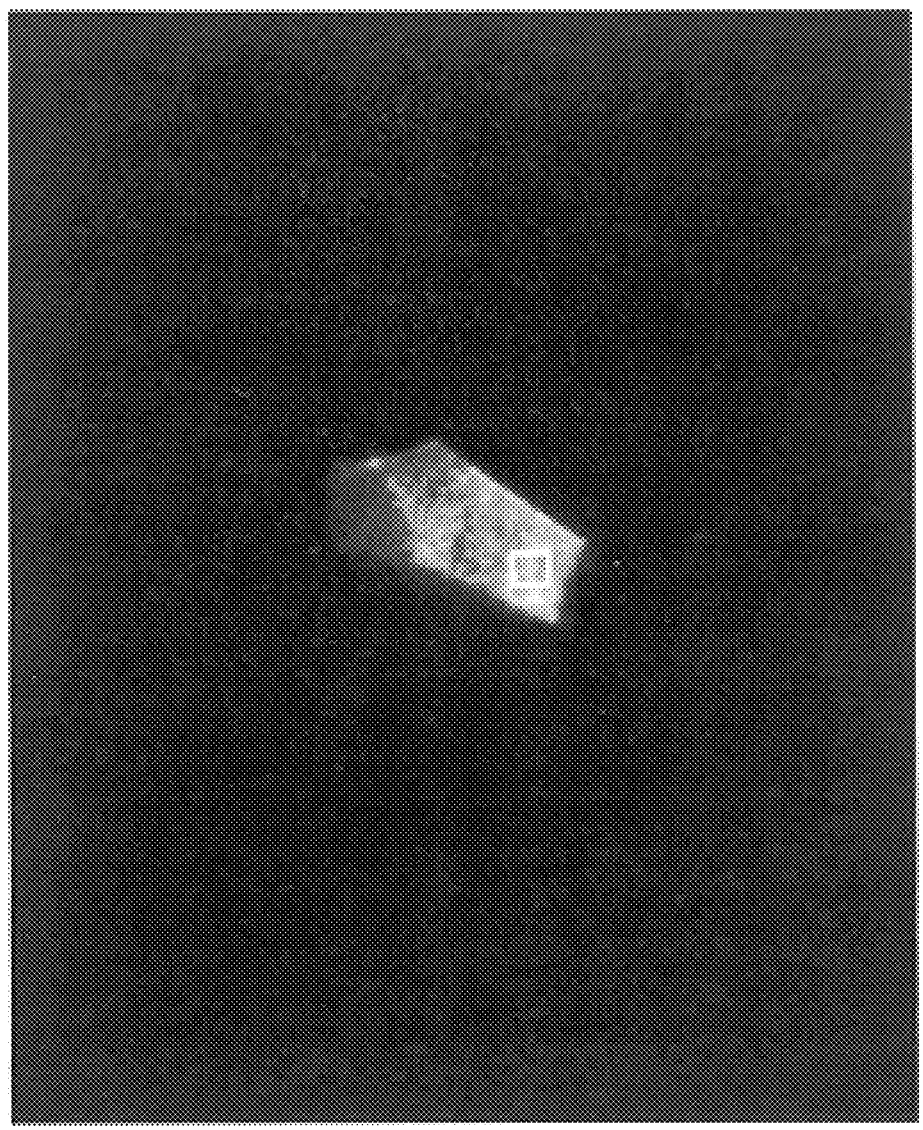

The excised femoral neck specimens were radiographically exposed under two conditions: a "simulated clinical" setup and a "verification" setup. A schematic diagram of the "simulated clinical setup used to radiograph the specimens is shown in FIG. 3(a). LUCITE was used as a scattering material to simulate soft tissue. The geometry of the setup and choice of screen-film system and grid are those that are currently used in the Department of Radiology at the University of Chicago Hospitals. A Lanex medium/TMG (Eastman Kodak; Rochester, N.Y.) screen-film system was used with an 8:1 focused grid. The distance from the focal spot of the X-ray tube to the film cassette was 100 cm, and the distance between the film cassette and the bottom of the first sheet of LUCITE was 7.6 cm. Placement of the specimens (angulation and anteversion) was performed by an orthopedic surgeon such that the orientation of the femoral neck was similar to its position in a standard pelvis radiograph. The specimens were held in this orientation by securing them in a polystyrene foam cup. The specimens were also radiographed using a high-resolution film (X-Omat TL, Eastman Kodak; Rochester, N.Y.) with the specimen in direct contact with the film. Direct exposure (i.e., no screen or grid) was used to produce this high-quality radiograph, referred to here as the "verification" setup. The "verification" setup is shown schematically in FIG. 3(b). The "verification" setup yields a high spatial resolution image with minimal x-ray scatter due to the absence of LUCITE and no light diffusion due to the absence of a screen. The pre-operative pelvis films of some patients were available. However, because the objective of these pre-operative films was to show the geometry of the hip joint, the films frequently displayed poor image quality in terms of density and contrast. An example of a pre-operative film is shown in FIG. 4(a). FIG. 4(b) shows a "clinical" specimen radiograph corresponding to the pre-operative film of FIG. 4(a). FIG. 4(c) shows a "verification" radiograph corresponding to the pre-operative film shown in FIG. 4(a). From FIGS. 4(a), 4(b), and 4(c), one can visualize the location of the bone specimen relative to the rest of the pelvic anatomy. The regions of interest shown in FIG. 4(b) and FIG. 4(c) are the regions from which the texture measures are calculated.

Biomechanical testing for the establishment of bone strength (i.e., "truth")

Figure 5A:
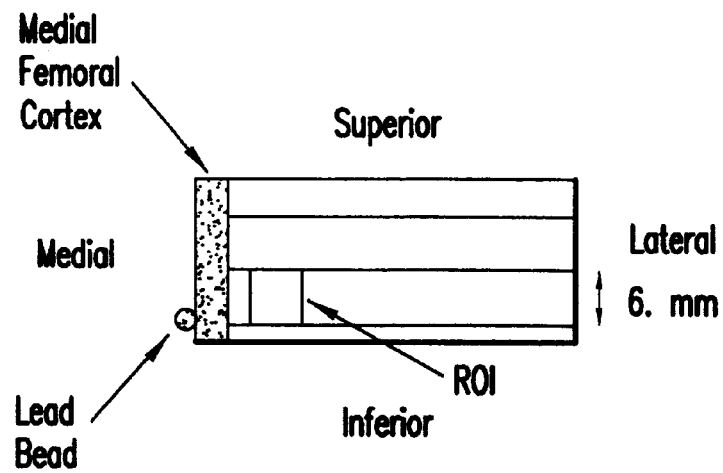
FIG. 5(a) and FIG. 5(b) are respective illustrations of (a) a side view of a specimen showing how, for strength testing, the bone cube is initially cut into bone disks having a height of 6.5 mm with the most inferior cut aligned with the bottom of the lead bead placed on the medial surface of the specimen, and (b) a top view of a bone disk showing how the disk is cut into 6.5 centimeter thick columns which were subsequently cut into 6.5 centimeter cubes (the arrows on the left indicate the projection of the ROI that was selected on the radiograph)

The cancellous (trabecular) bone were precisely cut into 6.5 mm cubes with an Isomet-2000 saw cutting system (Beuler Corp. Lake Bluff, Ill.). The specimens were first cut into disks in the plane perpendicular to the axis of the femoral neck specimen. The inferior cut of the first disk was aligned with the bottom of the lead bead as shown in FIG. 5(a).

Figure 5B:
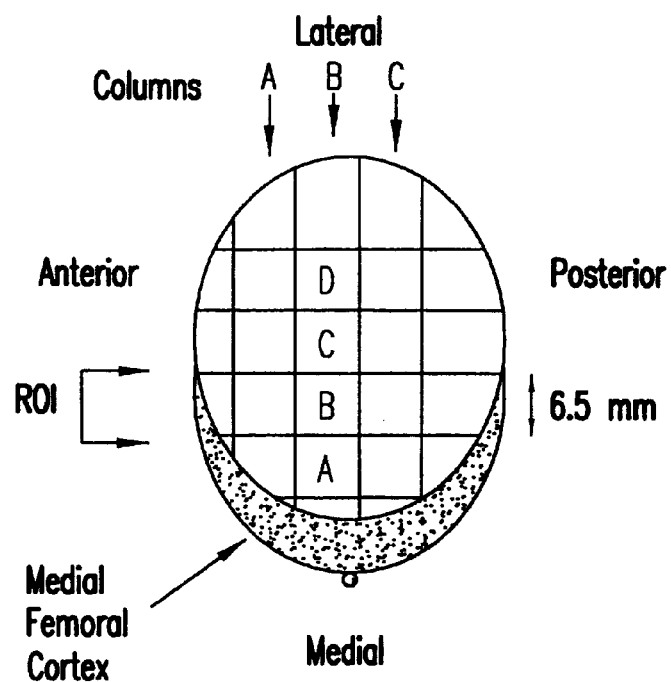

As depicted in FIG. 5(b), each disk was then cut into 6.5 mm columns from anterior to posterior (Columns A, B, and C in FIG. 5(b)). Each column was then cut into cubes. Medial femoral cortical bone was excluded from all specimens. For each femoral neck, multiple cubic specimens were machined along the anterior-posterior (AP) direction within a region corresponding to the ROI where the BMD was initially measured. Specimen cubes that corresponded to the ROI extracted on the digitized radiograph (discussed in greater detail in conjunction with computerized analysis below) were used to determine the strength of the specimen. The method for compressive strength testing is based on the method described by Linde et al. (1988) [45]. The compressive strength testing was performed with an Instron 8500 plus (Instron Corp., Park Ridge, Ill.) materials testing system. The cubes were placed between the platens so that compressive testing was performed in the superior-inferior direction. The specimens were first pre-loaded to a load of five Newtons. For preconditioning, the specimens underwent twenty cycles of compression to 0.5% strain and then relaxation at a rate of 0.2 cycles per second. After preconditioning, the load was returned to five Newtons, and then destructive testing was performed by increasing the strain at a rate of 0.1% strain per second until the specimen failed. All specimens machined from all femoral necks were tested destructively under compressive load using the same testing conditions, and the mechanical properties (the Young's modulus and the strength) were obtained for each bone cube. For each femoral neck, the overall Young's modulus (E) and strength (S) were computed by averaging the values obtained from all bone cubes (two to four cubes) within the corresponding ROIs.

Figure 6:
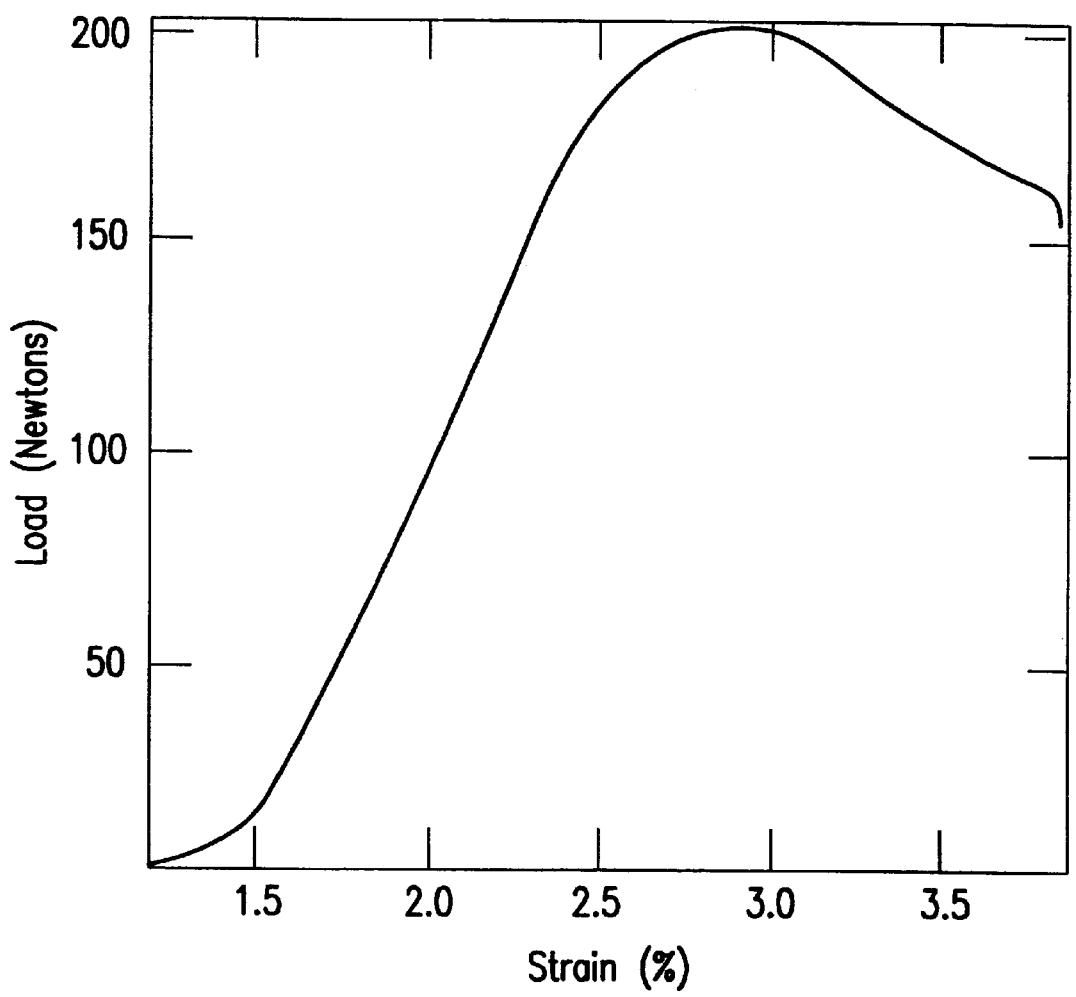
FIG. 6 is a graph showing the how load-to-failure is determined from mechanical testing.

Using the load-strain information shown in the graph of FIG. 6, the destructive modulus was calculated as the maximal slope of the load-strain curve divided by the cross-sectional area of the specimen. The stress to failure of the specimen was obtained from the peak of the stress-strain curve. The strength value used for assessing the performance of the texture features was taken to be the average value of the strength measures of the cubes that had at least fifty percent of their area within the ROI from the radiographs.

Bone geometry and volumetric bone mineral density

Figure 7:
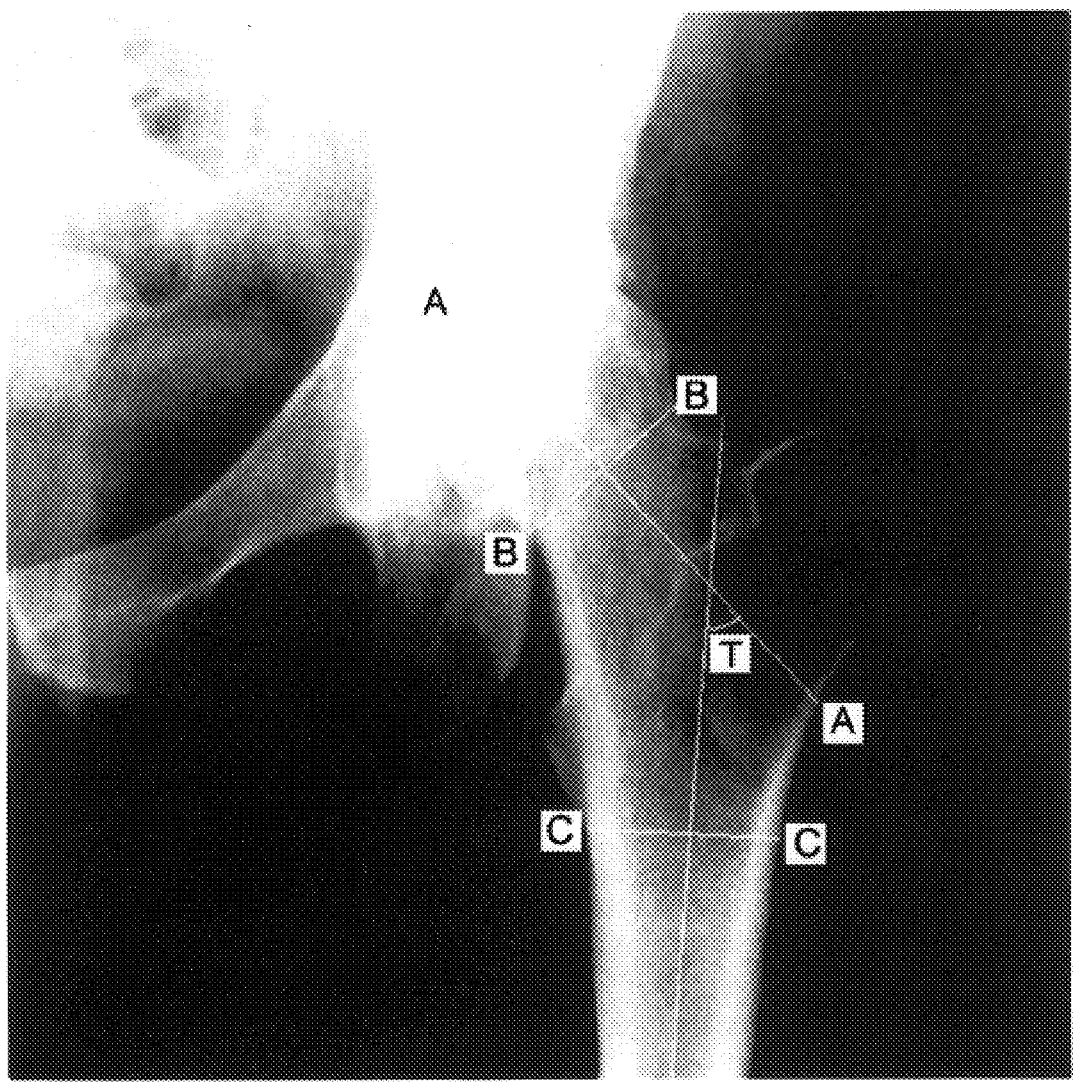
FIG. 7 is an image showing an ROI and several geometric measures from the proximal femur of a subject.

Femur geometry was measured from the standard pelvic radiograph for each patient. The radiographs were digitized with a laser film digitizer (LD4500, Konica Corp., Tokyo Japan) to a spatial resolution of 121×121 $\mu$m and 10-bit quantization levels. An interactive display program was developed using IDL (Research Systems, Inc., Boulder Colo.) software in order to measure femur geometry as suggested by Karlsson et al. (1996) [8]. All the measures were performed by a musculoskeletal radiologist. The geometric measures shown in FIG. 7 were used to normalize the area-based BMD. These geometric measures included the femoral neck width (BB) and the femoral shaft width (CC) measured right below the lesser trochanter.

The femoral neck and the femoral shaft from which the widths were measured are nearly circular, and thus, the values of BB and CC can be treated as diameters of the corresponding regions. The normalized BMD (nBMD, $g/cm^3$) was computed from the measured area BMD ($g/cm^2$) normalized by the diameter, i.e.

$$nBMD_\phi = \frac{BMD}{BB}, \text{ or} \quad (1)$$

$$nBMD = \frac{BMD}{CC}. \quad (2)$$

Since the BMD was measured from the femoral neck, it is desirable to use femoral neck diameter to obtain $nBMD_N$. However, in some cases osteophytes were observed on the medial and lateral sides of the necks. In these cases, the measurement of neck width could be biased. Specifically, the measured neck width in the medial-lateral (ML) direction could be greater than the actual neck width in the AP direction. Therefore, the femur shaft width was also investigated as a measurement with which to normalize BMD.

Analysis of variance was performed to show the mean difference in the measured femoral neck width and shaft width. Regression analyses were performed between either the BMD or the normalized BMD values, and the mechanical properties of the bone. Both linear and squared power law models were used in the regression analyses. The coefficient of determination ($R^2$) was used to measure the explanatory or predictive power of bone mechanical properties by the area BMD and volumetric BMD.

Figure 8:
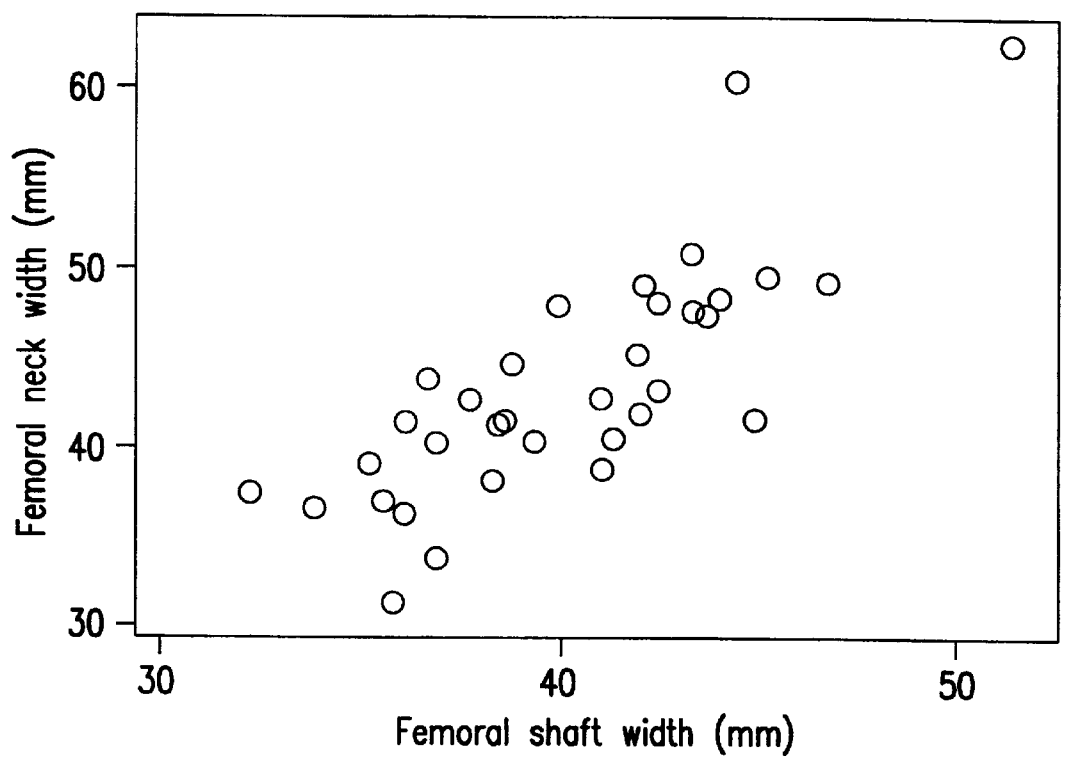
FIG. 8 is a graph showing the linear relationship between femoral neck width (BB) and femoral shaft width (CC)
Figure 9A:
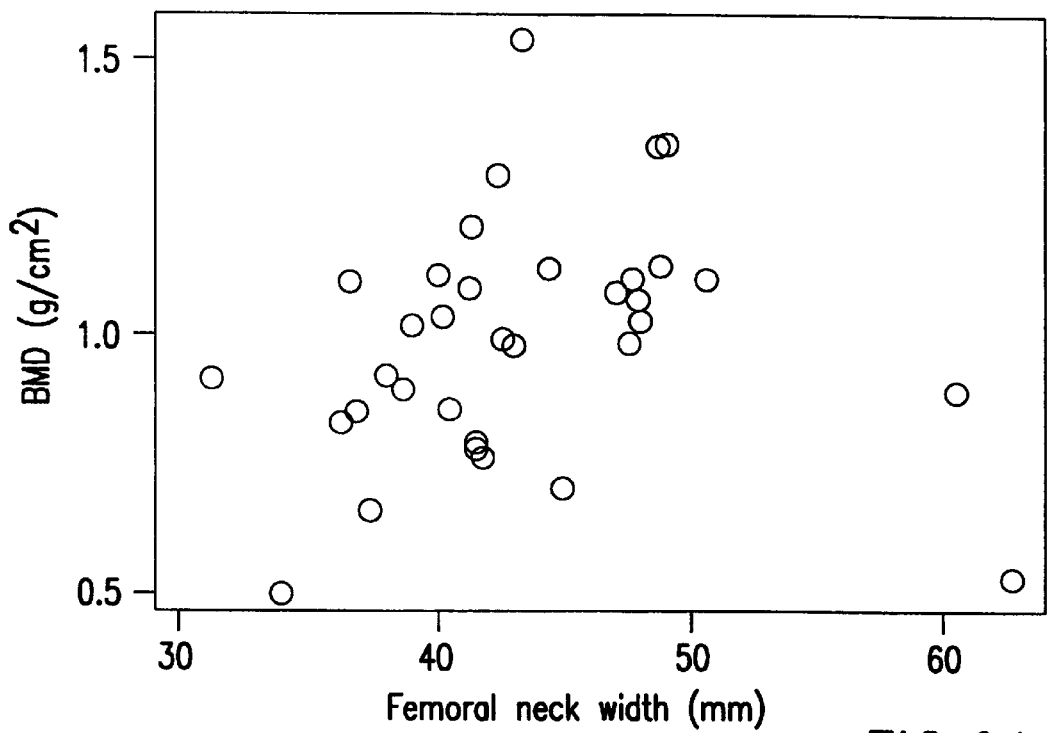
FIG. 9(a) and FIG. 9(b) are respective plots showing (a) the dependency of BMD on bone size and (b) the dependency of BMD on femoral neck width.

The descriptive statistics of measured femoral neck width (BB) and shaft width (CC) are shown in Table 1. Although, analysis of variance showed that the measured widths of BB and CC were significantly different (p-value less than 0.02), the absolute mean difference in the measured widths were quite small. The average neck width was only 8% larger than the average shaft width. Table 1 also demonstrates large patient-to-patient variations in the measured bone size, e.g., the maximum shaft width was 60% larger than the minimum shaft width and that was nearly twice as large for the measurement of neck width. FIG. 8 shows strong correlation between the neck and shaft widths. The coefficient of determination ($R^2$) was 0.65. FIGS. 9(a) and (b) show the relationship between the area-based BMD and bone size. Table 1 shows a descriptive statistics of the geometrical measurements and BMD's from the proximal femora.

TABLE 1

| Variables | Means | Standard deviation | Minimum | Maximum |
|---|---|---|---|---|
| BB (mm) | 43.77 | 6.67 | 31.57 | 62.79 |
| CC (mm) | 40.50 | 4.23 | 32.38 | 51.81 |
| BMD ($g/cm^2$) | 0.98 | 0.22 | 0.52 | 1.53 |
| $nBMD_N$ ($g/cm^3$) | 0.23 | 0.05 | 0.09 | 0.35 |
| $nBMD_S$ ($g/cm^3$) | 0.24 | 0.06 | 0.10 | 0.42 |

*$nBMD_N$ - BMD normalized using femoral neck width (BB);
$nBMD_S$ - BMD normalized using femoral shaft width (CC).

Figure 10A:
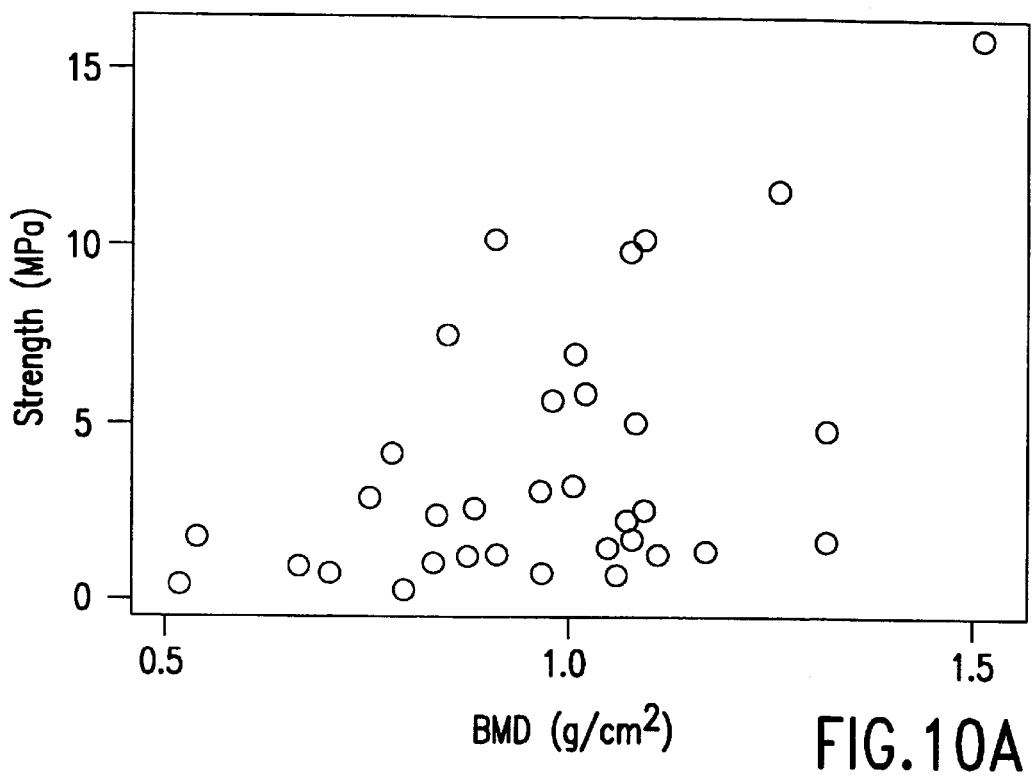
FIG. 10(a), FIG. 10(b), and FIG. 10(c) are respective plots showing (a) the linear relationship between bone strength and the area-based BMD, (b) the power law relationship between bone strength and the BMD normalized with the femoral neck width ($nBMD_N$), and (c) the power law relationship between bone strength and the BMD normalized with the femoral shaft width ($nBMD_s$)

FIG. 10(a) shows the relationship between strength and the area-based BMD. The coefficients of determination ($R^2$) of the generalized linear regressions for the area-based BMD and strength are shown in Table 2, and for the area-based BMD and Young's modulus are shown in Table 3. The $R^2$'s for both linear and power law relationships are presented in the tables. It is clear that the power law models explain more variability in bone mechanical properties. Compared with the linear models, the power law models improved the $R^2$'s by 22% and 13% for predicting Young's modulus and strength, respectively. Table 2 shows coefficients of determination ($R^2$) between strength (S) and bone density (D) in linear and power law relationships. Table 3 shows coefficients of determination ($R^2$) between Young' modulus (E) and bone density (D) in linear and power law relationships.

TABLE 2

| Predictor | Linear Model | Squared Power Law Model |
|---|---|---|
| BMD ($g/cm^2$) | 0.238 | 0.268 |
| $nBMD_N$ ($g/cm^3$) | 0.300 | 0.363 |
| $nBMD_S$ ($g/cm^3$) | 0.319 | 0.372 |

Note:
$nBMD_N$ - BMD normalized using femoral neck width (BB)
$nBMD_N$ - BMD normalized using femoral shaft width (CC).
(p-value ≦ 0.001 for all models)

TABLE 3

| Predictor | Linear Model | Squared Power Law Model |
|---|---|---|
| BMD ($g/cm^2$) | 0.251 | 0.306 |
| $nBMD_N$ ($g/cm^3$) | 0.291 | 0.381 |
| $nBMD_S$ ($g/cm^3$) | 0.338 | 0.431 |

Note:
$nBMD_N$ - BMD normalized using femoral neck width (BB)
$nBMD_N$ - BMD normalized using femoral shaft width (CC).
(p-value ≦ 0.001 for all models)

Figure 10B:
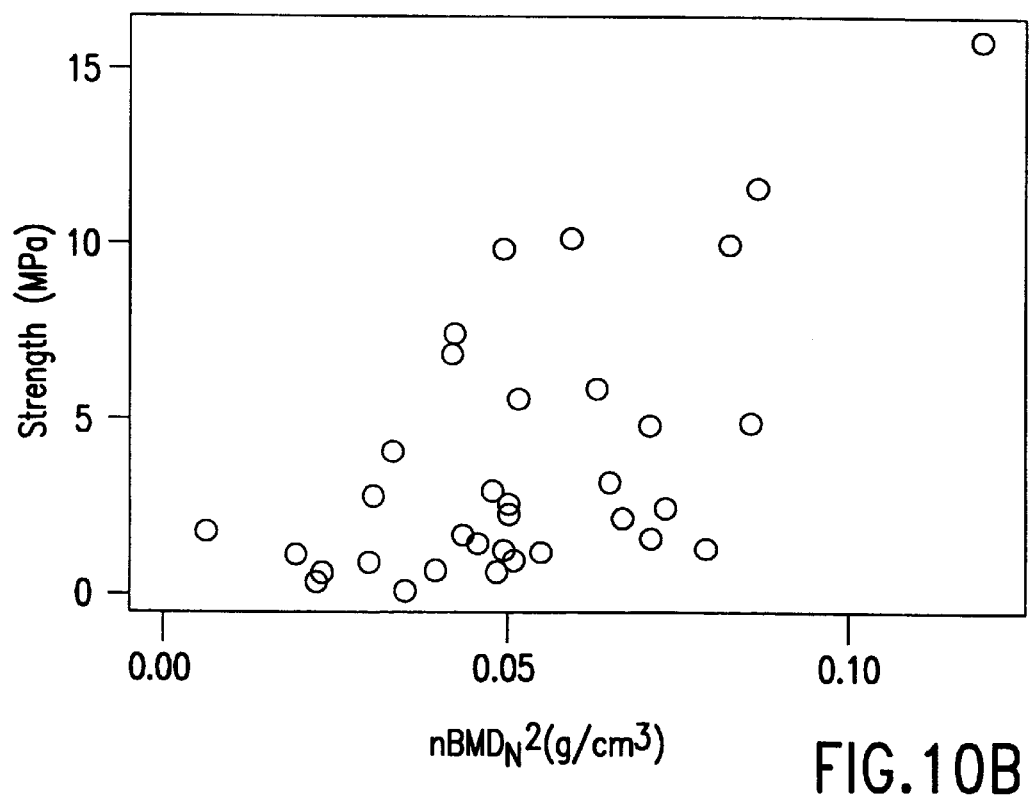
Figure 10C:
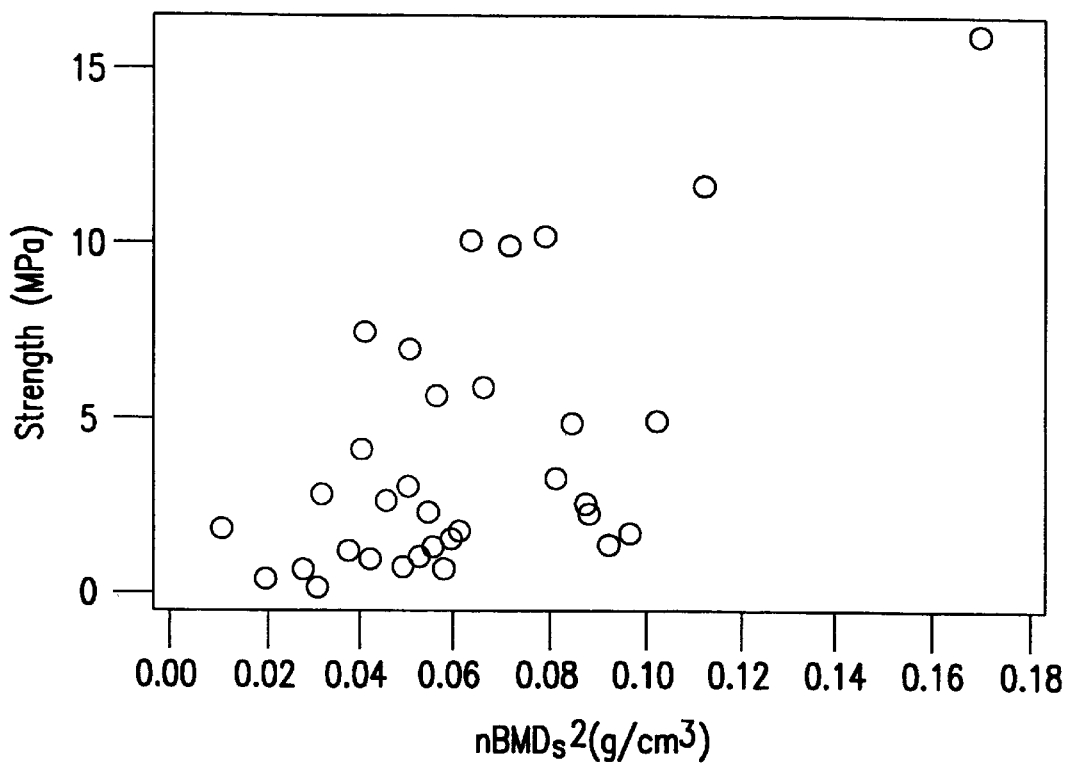

The effects of normalized BMD on the prediction of bone strength are graphically shown in FIG. 10(b) and FIG. 10(c).

It is apparent that the normalization reduced data variability and revealed a more linear trend between the strength and either $nBMD_N$ or $nBMD_s$. The percent variation in strength explained by the normalized BMD using both linear and power law models, as quantified by the $R^2$'s, are also presented in Table 2. For the linear model, normalization increased the $R^2$'s by 26% and 34% for the area-based BMD normalized by the neck width ($nBMD_N$) and by the shaft width ($nBMD_s$), respectively. For the power law model, the increases in $R^2$'s were 35% and 39% using $nBMD_N$ and $nBMD_s$, respectively. As with bone strength, the normalization caused a similar improvement in the correlation between bone density and Young's modulus as shown in Table 3.

Figure 9B:
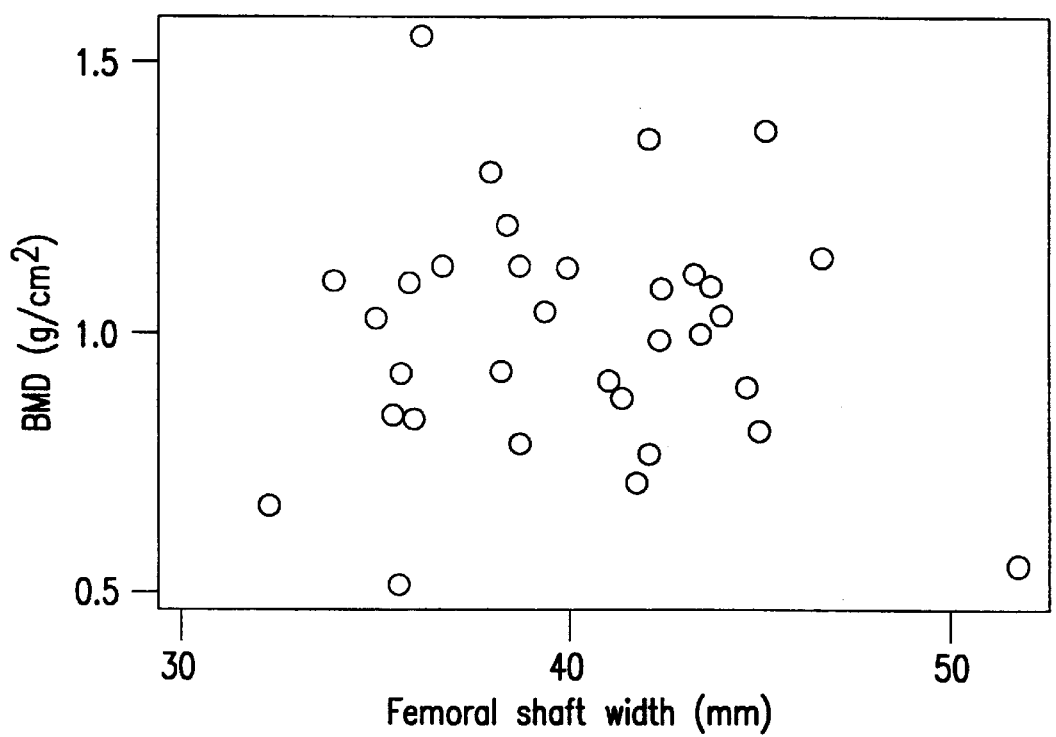

Since the BMD measure produced by DXA is an area-based density, it is valid to compare the BMDs of patients with similar bone size. However, test results showed that the variation in bone size could be very high, e.g. the largest neck width was nearly twice as large as the smallest one. In addition, as suggested by FIG. 9(a) and FIG. 9(b), there is a clear trend that BMD is a function of bone size. As a consequence, the BMD measurements of patients with different bone sizes could be misleading. Therefore, a normalization procedure is useful for relative comparison. Test results showing increased $R^2$ between the mechanical properties and the normalized BMD further verify this argument.

Osteophytes were observed on femoral necks for some of the cases. The osteophytes were mainly in the medial and lateral surfaces of femoral necks. Therefore, the measured neck width could be larger than the actual width for these cases. The large variation in the neck width measures (see, for example, the standard deviations in Table 1) as compared to that of the shaft width measures may be due to this phenomenon. As a consequence, the $nBMD_N$ (using femoral neck width) was expected to be less accurate than the $nBMD_s$. Since a normalization method was sought for relative comparison rather than measuring true volumetric density, femoral shaft width appeared to be a better measure for the normalization.

The justification for this choice is based on the following reasons: (1) femoral neck width and shaft width are virtually identical (8% difference in the means) so that shaft width represents bone thickness in the neck region; (2) femoral neck width and shaft width are linearly correlated (FIG. 8, $R^2=0.65$) even with the inclusion of osteophytes in the measurement of neck width; (3) no osteophytes were observed in the lesser trochanter region from where the shaft width is extracted; and (4) femoral shaft width can be measured either from pelvis radiographs or directly from DXA scans (Faulkner et al., 1994 [6]; Karlsson et al., 1996 [8]) so that a noninvasive evaluation is possible.

The results obtained from analyzing the database suggest two ways in which the clinical evaluation of bone quality can be improved. First, BMD can be normalized using a squared power law relationship. Substantial improvement was achieved by simply normalizing the measured BMD with bone size. In the prediction of bone strength, the $R^2$ was 0.372 when normalized BMD with the power law model was used. Using $R^2$ as a basis for comparison, the use of normalized BMD with the power law resulted in a 56% improvement over the simple model that did not use normalization ($R^2$ was only 0.238). Although in the setup, the BMD measured in the femoral neck region was normalized, the results strongly support the analytic approach developed by Carter et al. (1992) [5] for predicting BMD of whole vertebral bodies.

Although various power law relationships with different exponents have been reported in the literature, our data are best described by a squared power law relationship. Many reports (e.g., Carter and Haye, 1977 [4]; McBroom et al., 1985 [12]) have shown that, using BMD as a single predictor, the squared power law relationship best describes both modulus and strength. With the present invention, the power law models improved the $R^2$'s from 13% to 30% in comparison to the simple linear models,.

With the present invention, $R^2$ values between bone mineral density and mechanical properties ranged from 0.24 to 0.31 for both linear and squared models. In comparison with the typical $R^2$ values reported in literature (which range from 0.4 to 0.8 as summarized by Keaveny and Hayes (1993) [9]), the $R^2$'s obtained with the present invention were quite low.

This is not surprising because, in most of the reports, both the BMD and mechanical testing were conducted on the cubic specimens as opposed to the simulated femoral neck setup. The present invention incorporates the femoral neck setup to measure the BMD. As a result, the BMD obtained by the present invention is an integral measurement of area density that includes both cortical and trabecular bone in the entire thickness of the femoral neck. Further, mechanical testing was performed only on the trabecular bone cubes machined from the bone region that corresponded to the ROI where the BMD was measured. Consequently, both the bone size variation and the misalignment between the ROI and the cubes may have contributed to lower $R^2$'s.

The purpose of the present invention is not to develop a method for measuring true volumetric bone mineral density. Instead the inventors of the present invention have tried to (1) emphasize the problem of using area-based BMD, and (2) establish the feasibility of using DXA and radiography to assess bone quality in clinical applications. Standard clinical pelvis radiographs were used for the measurement of the bone geometry. However, because of the high spatial resolution obtained from DXA (Lang, 1998 [[10]]), DXA can be directly used to measure both BMD and the bone geometry so that the need for an additional imaging modality can be avoided.

Using BMD and geometric bone data, the results obtained with the inventive method suggests that the use of DXA-based bone densitometry to predict bone mineral status can be improved with the inventive method. The area-based BMD obtained using DXA was normalized by a geometric measure obtained from standard pelvic radiographs. Results show notable improvement in predicting bone mechanical properties using the normalized bone mineral density (i.e., volumetric BMD). The inventors have concluded that the inventive method, which is essentially a simulated in vivo method, is a simple and cost-effective modification of bone densitometry, and holds potential for enhancing the performance of DXA for clinical applications.

Analysis of bone structure pattern

Radiographs were digitized with a Konica LD4500 laser film digitizer (Konica Corp.;

Tokyo, Japan) with 0.12 1 -mm pixel size and 10-bit quantization. Regions-of-interest (ROIs) of dimension 64×64 pixels were selected in the medial portion of the femoral neck by an orthopedic surgeon. An example of ROI placement is shown in FIGS. 4(b). The ROIs were positioned to avoid overlapping structures (e.g. osteophytes). Correction was performed for the possible nonlinear nature of the detector's characteristic response (the H&D curve for radiographic films as detector) and for the background trend within the ROI image data. Background trend correction is necessary since the variation in optical density within the ROI in hip images includes variations due to the gross anatomy of the human body (background trends) and variations due to the fine underlying texture which is related to the trabecular pattern of the bone. The nonuniform background trend can be determined using a 2-dimensional surface fitting technique (such as one with a second degree polynomial function) (Katsuragawa et al., 1988 [35]). The fitted trend is subtracted from each ROI in order to yield the underlying fluctuations, i.e., the trabecular pattern. Prior to any computerized texture analysis, this background correction was performed on the ROIs.

Figure 11A:
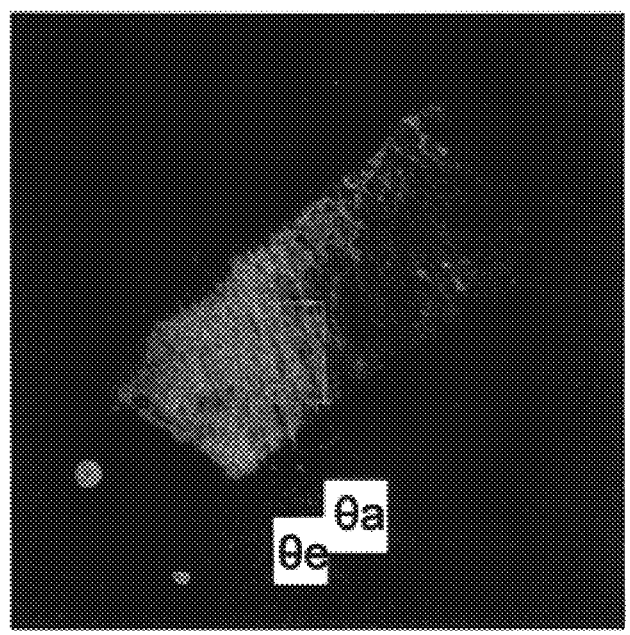
FIG. 11(a) and FIG. 11(b) are respective images of (a) a radiograph of the femoral neck specimen from the femur, and (b) a selected ROI from the neck radiograph.
Figure 11B:
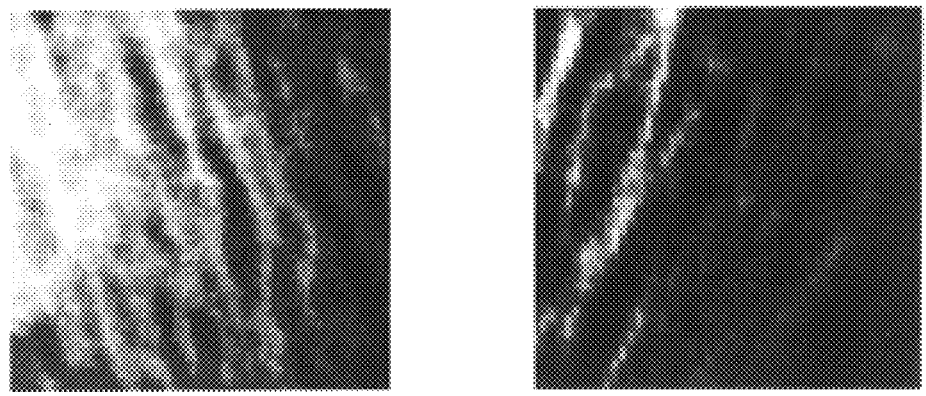

The ROI was selected in the medial portion of the neck where the cubic bone specimens were machined for mechanical testing (FIG. 11(a)). FIG. 11(b) shows a selected ROI from the neck radiograph in FIG. 11(a).

Fractal analysis was performed on the ROIs using either Minkowski dimension or surface area based methods.

Figure 12:
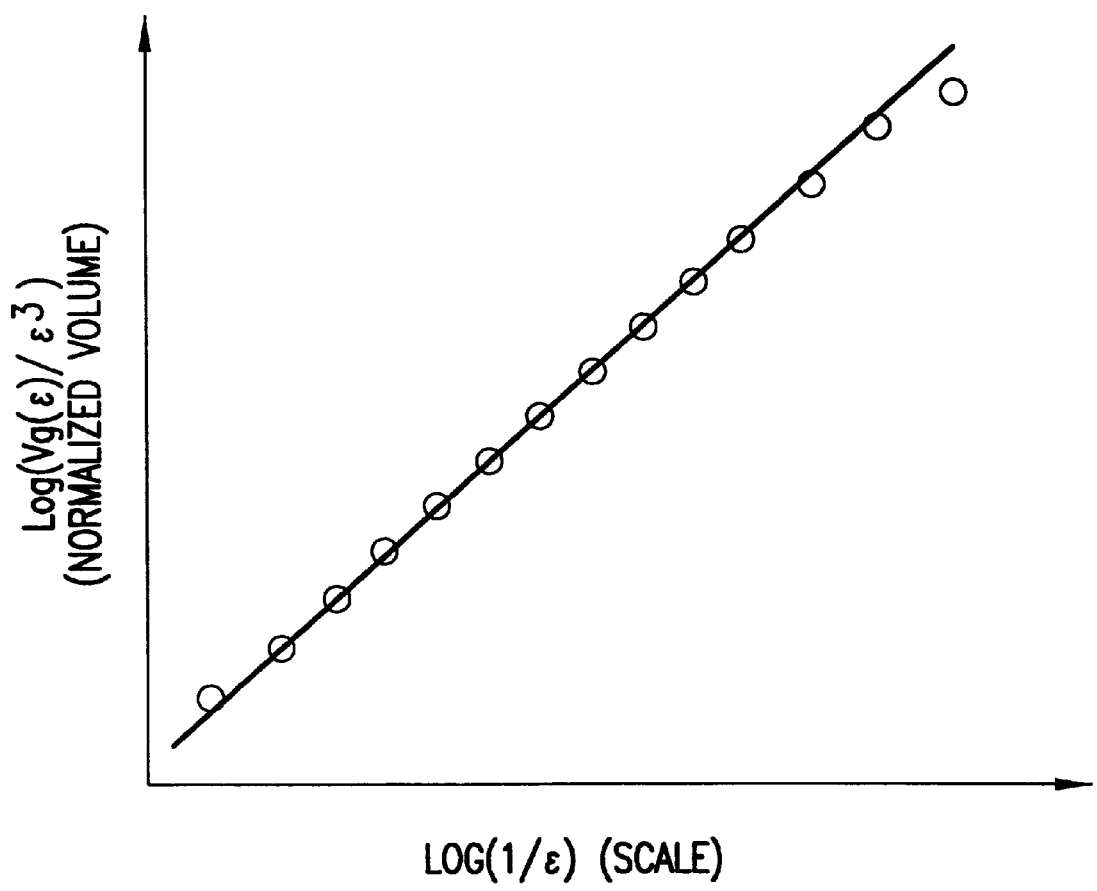
FIG. 12 is a graph showing the relationship between the normalized volume and the scale and showing the slope used to determine the Minkowski dimension.

For a ROI image f of 64×64 pixels in size, the global Minkowski dimension, $D_M[f]$, is computed by (Maragos, 1994 [40]), $$D_M[f] = \lim_{\varepsilon \to 0} \frac{\log[V_g(\varepsilon)/\varepsilon^3]}{\log(1/\varepsilon)}, \quad (3)$$

where for a structuring element g at scale $\varepsilon$, $V_g(\varepsilon)$ is the "volume" between two processed versions of f obtained using morphological operators. The volume $V_g(\varepsilon)$ is computed by $$V_g(\varepsilon) = \sum_{m=0}^{64} \sum_{n=0}^{64} \{(f \oplus \varepsilon g) - (f \ominus \varepsilon g)\}, \quad (4)$$

where $(f \oplus \varepsilon g)$ and $(f \ominus \varepsilon g)$ are the dilated version and the eroded version, respectively, of the image obtained using a structuring element g at scale e. Note that $V_g(\varepsilon)$ is the volume arising from the difference between the dilated and eroded surfaces. Finding the slope of the least-square fitted line between $\log[V_g(\varepsilon)/\varepsilon^3]$ and $\log(1/\varepsilon)$ gives the estimated fractal dimension as shown in FIG. 12.

To compute the directional Minkowski dimension, the ROI image is rotated from $\theta=0°$ to $360°$ with a $10°$ increment (Jiang et al. 1998b [34]). For each rotation $\theta$, the volume, $V_g(\varepsilon)_\theta$, is calculated by $$V_g(\varepsilon)_\Theta = \sum_{m=0}^{64} \sum_{n=0}^{64} \{(f_\theta \oplus \varepsilon g) - (f_\theta \ominus \varepsilon g)\}, \quad (5)$$

where $f_\theta$ is the original ROI image rotated by $\theta$. The directional Minkowski dimension as a function of $\theta$, $D_M[f]_\theta$, is then computed from Equation (3) using the calculated volume from Equation (5) for each rotation.

Figure 13A:
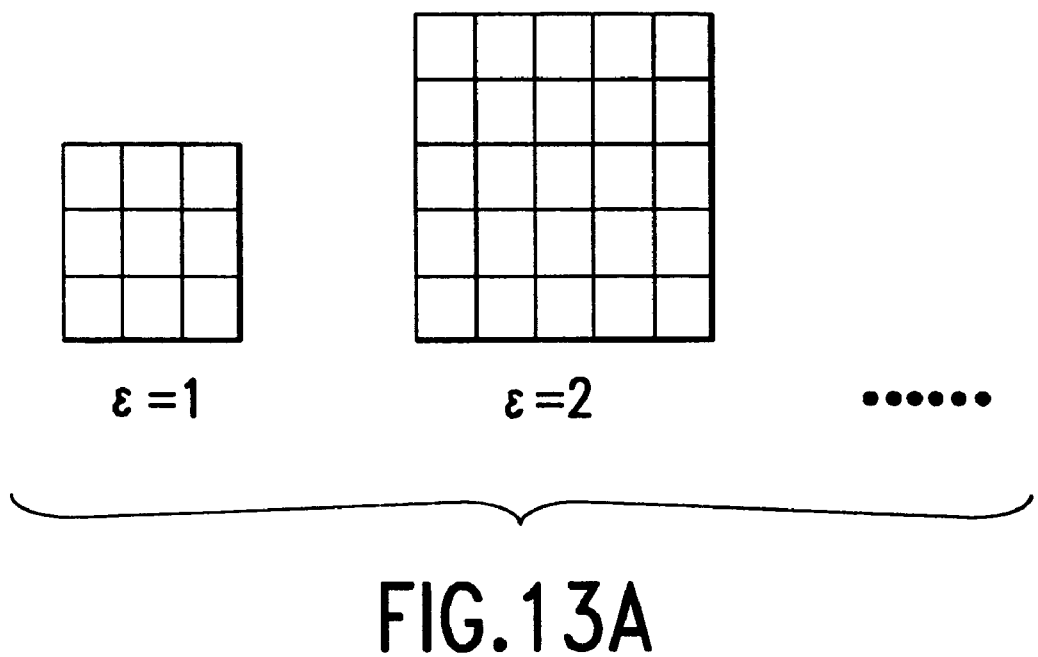
FIG. 13(a) and FIG. 13(b) are respective illustrations of (a) a squared structuring element of 3×3 pixels used to compute the global Minkowski dimensions, and (b) a horizontal structuring element of 3×1 pixels used to compute the directional Minkowski dimensions.
Figure 13B:
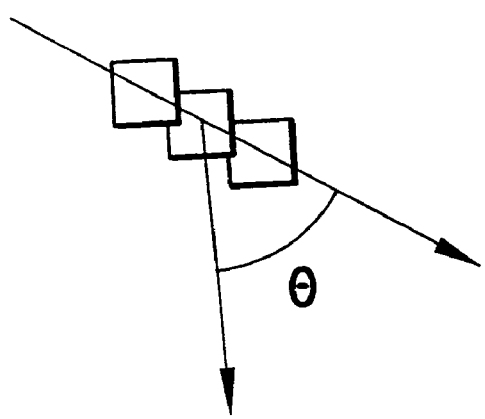
Figure 14:
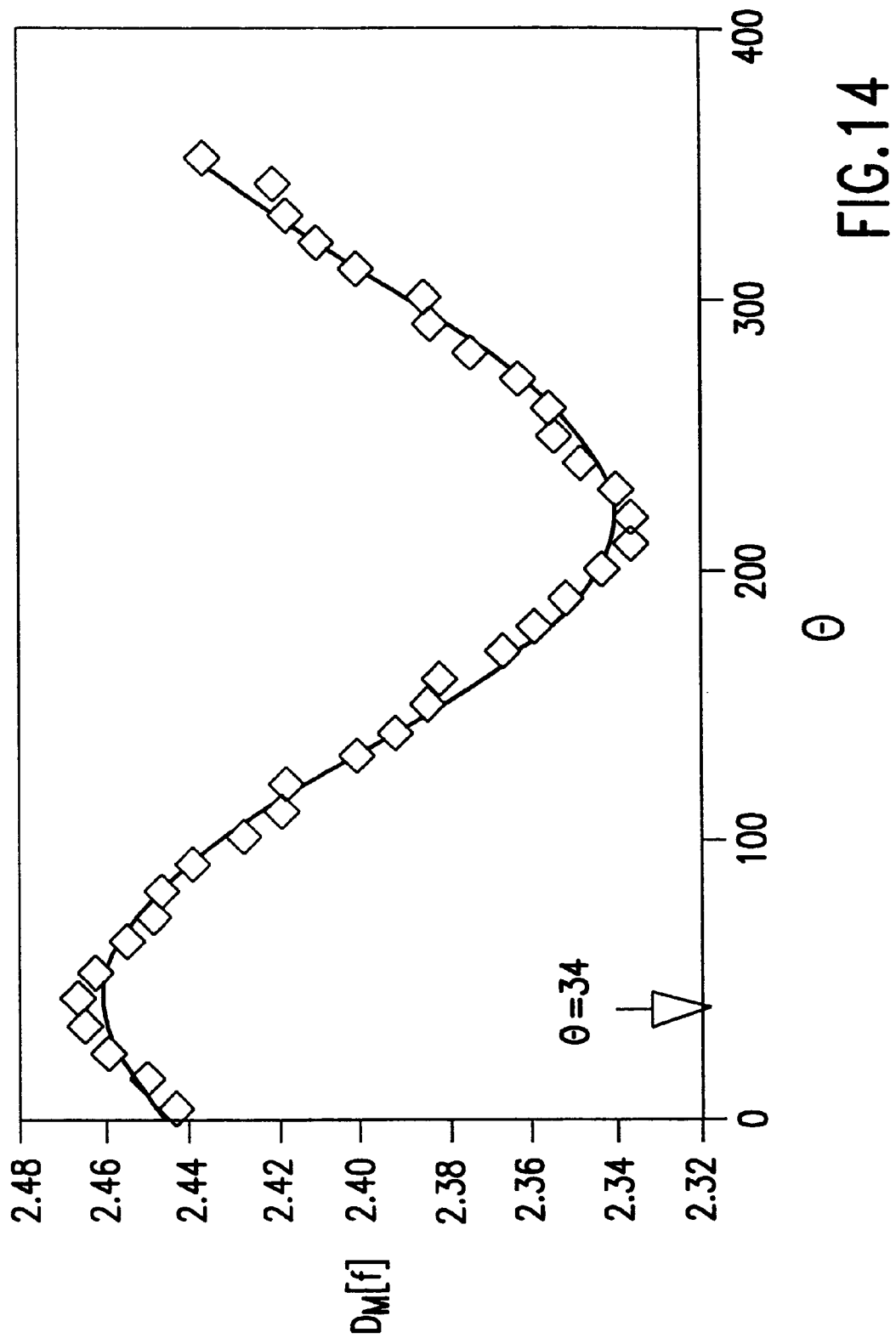
FIG. 14 is a graph showing the directional Minkowski dimension as a function of the angle of a structuring element for a single ROI.
Figure 15:
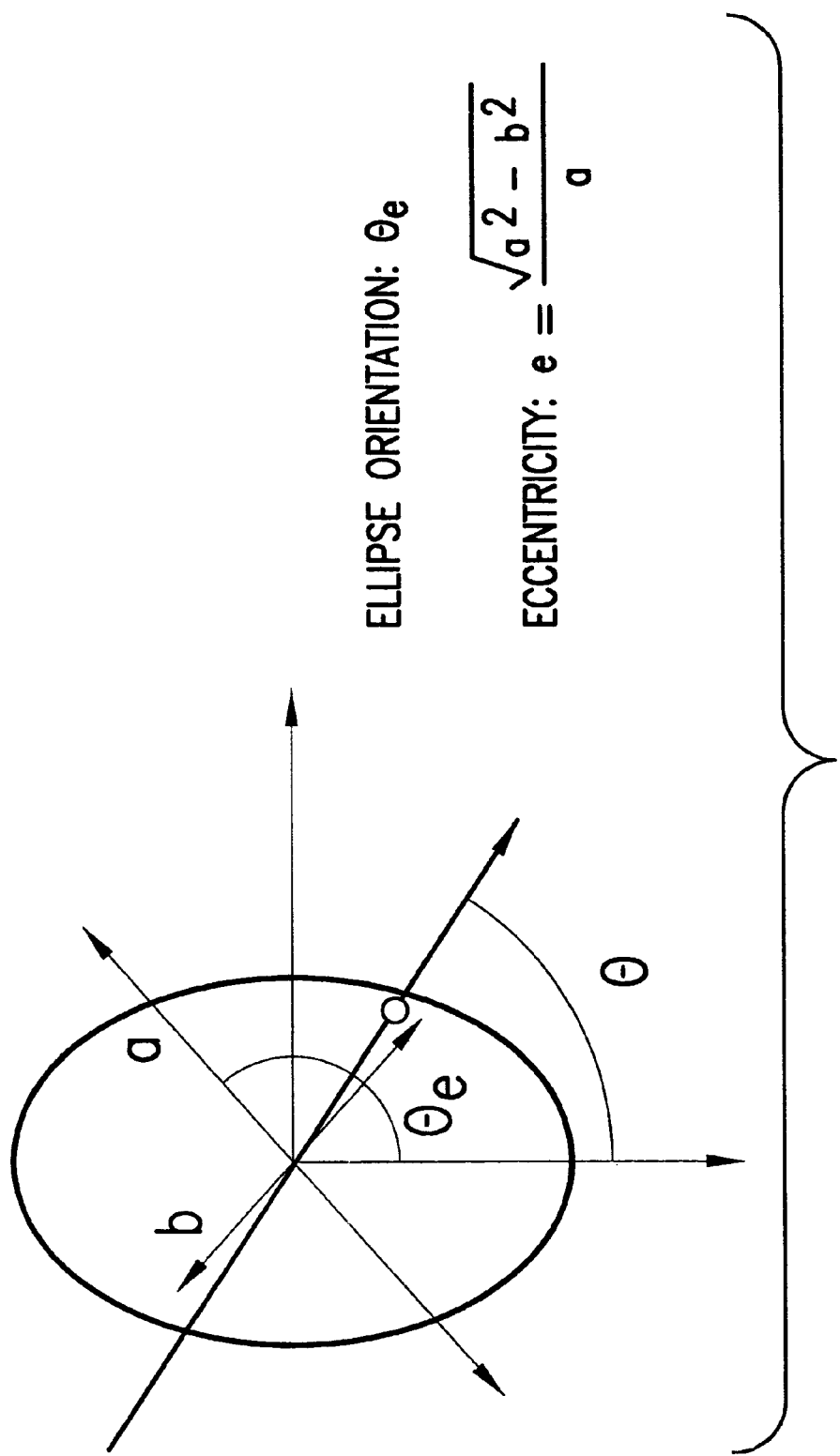
FIG. 15 is a graph showing the parameters of an ellipse used in characterizing the plot shown in FIG. 14.

A squared structuring element of 3×3 pixels (FIG. 13a) and a horizontal structuring element of 3×1 pixels (FIG. 13b) were used to compute the global (Equation (2)) and directional (Equation (3)) Minkowski dimension, respectively (Jiang et al., 1998a [33]). The resulting plot of $\theta$ vs. the directional Minkowski dimension is shown in FIG. 14. The directional fractal dimension as a function of $\theta$ was fit to an ellipse using a least-square fitting method to describe the textural anisotropy of the X-ray images. The ellipse parameters, the major and minor diameters (a and b), eccentricity (e=sqrt $(a^2-b^2)$/a), and ellipse orientation ($\theta_e$), were used to describe the image texture which, in turn, characterizes trabecular structure (FIG. 15).

Figure 16:
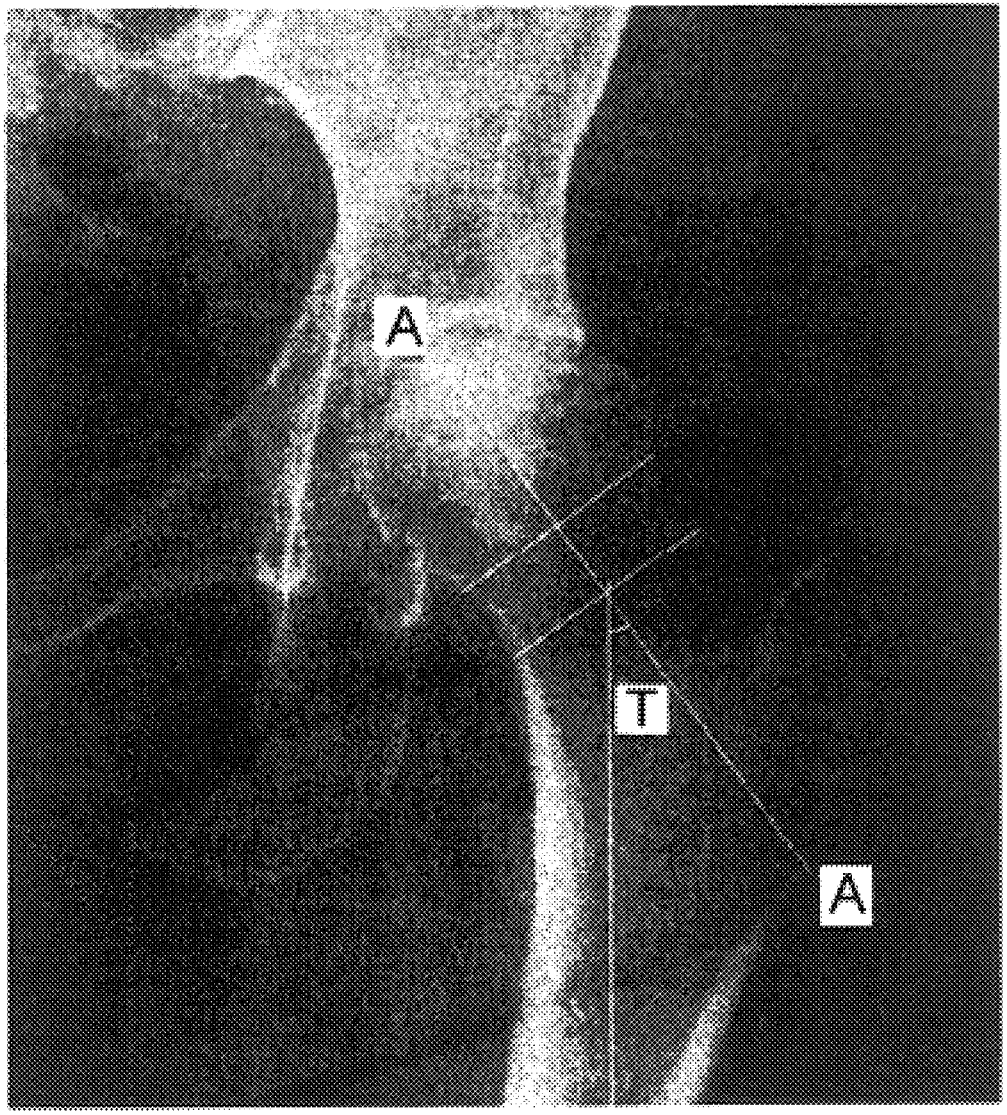
FIG. 16 is an image of a pelvis radiograph showing the orientation from the Minkowski dimension analysis relative to the direction of the ROI submitted for mechanical testing.

Since the machined bone cube and the selected ROI from the neck radiograph were at different orientations as shown in FIG. 11(a), the actual ellipse orientation ($\theta_a$) was computed relative to the direction of mechanical testing. Thus, $\theta_a$ varies from 0 to 90 degrees based on the original ellipse orientation ($\theta_e$) and the angle (T) of the femoral neck axis. T was determined by a radiologist for each case using the pelvic radiographs (FIG. 16).

Overall, the various computer-extracted, fractal-based features obtained from each ROI image included a global description of image roughness, $D_M[f]$, and the measures, a, b, e, and $\theta_a$, to characterize the anisotropy of the image texture.

Figure 17A:
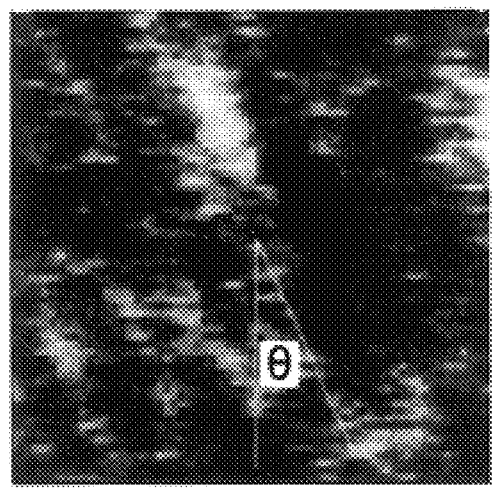
FIG. 17(a) is an image of a representative ROI where BMD=0.2054, $D_M[f]$=2.59, and $\theta_e$=34°.
Figure 17B:
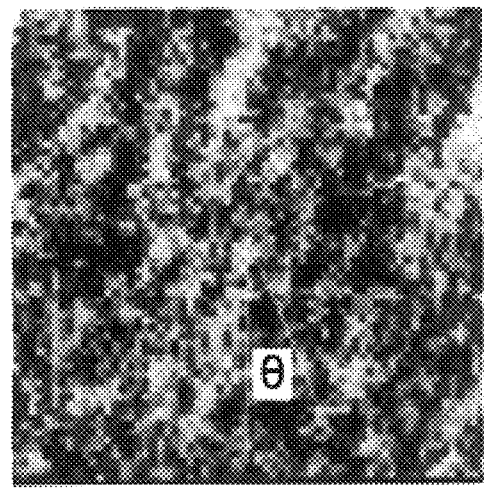
FIG. 17(b) is an image of a representative ROI where BMD=0.2052, $D_M[f]$=2.73, and $\theta_e$=149°.
Figure 17C:
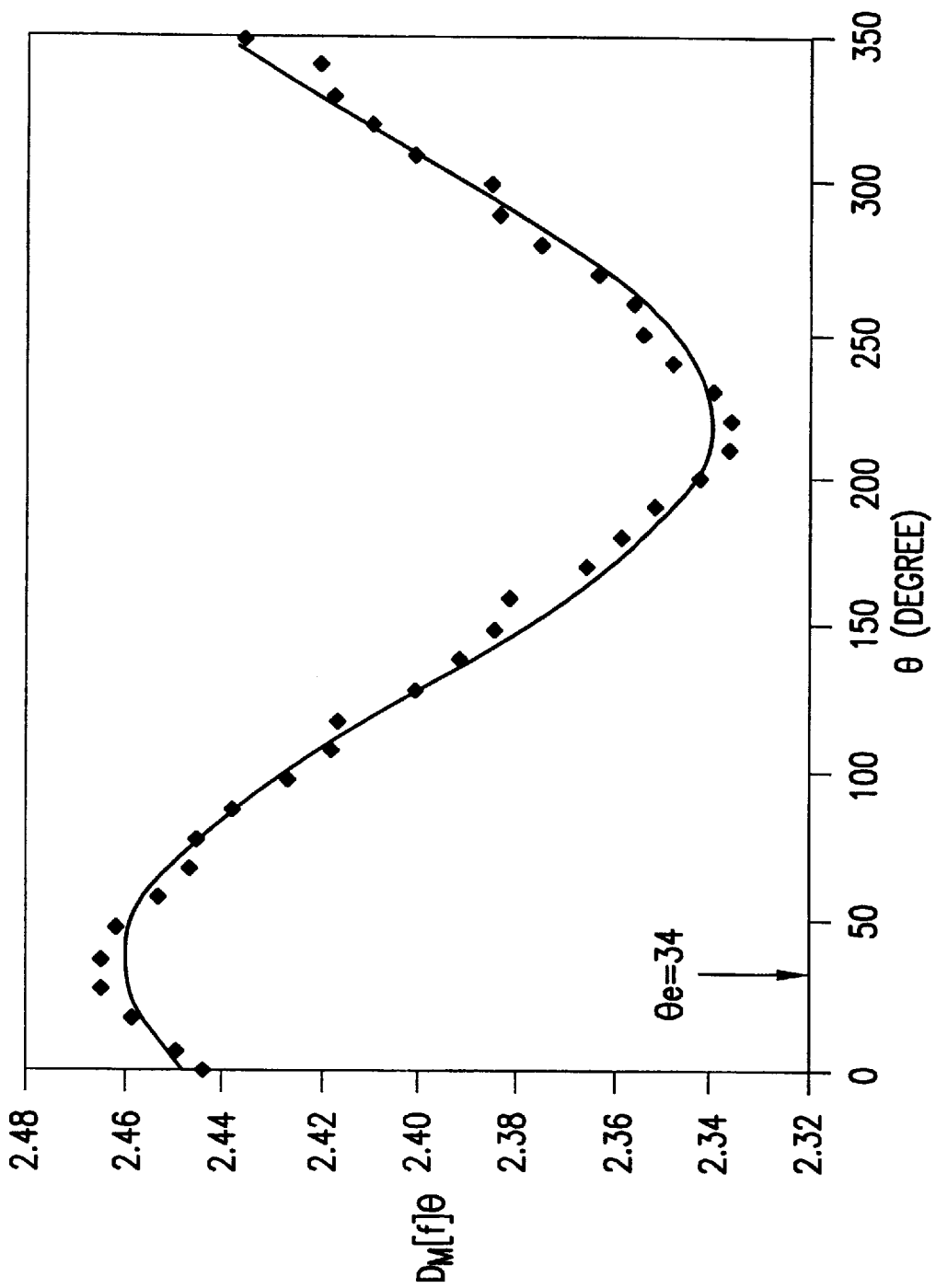
FIG. 17(c) and FIG. 17(d) are plots of the ellipse fitting data for FIG. 17(a) and 17(b), respectively.
Figure 17D:
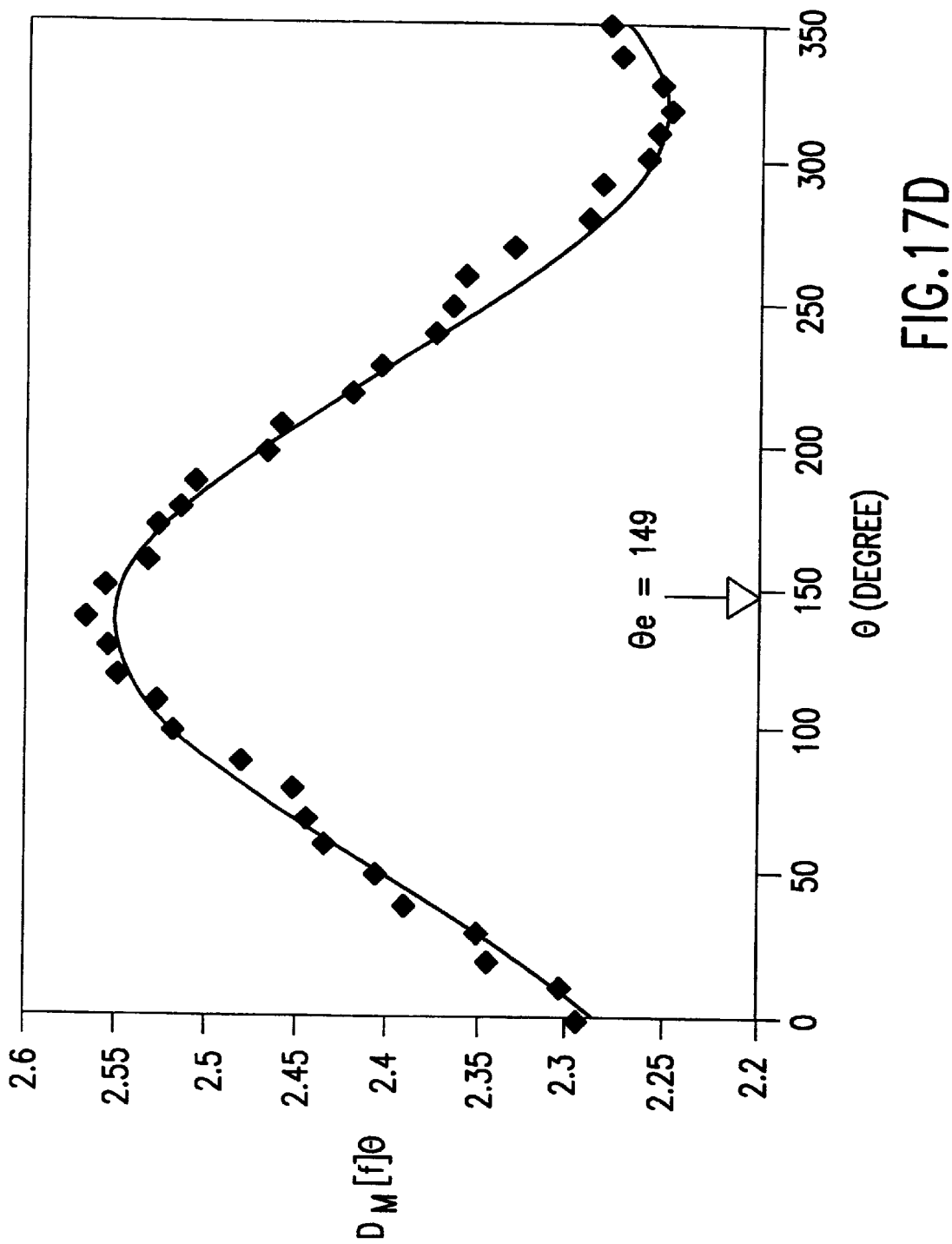

The ROI's from two different cases that have identical BMD's are shown in FIG. 17 (the nBMD's are 0.2054 and 0.2052 for the cases in FIGS. 17(a) and 17(b), respectively). However, the global Minkowski dimension ($D_M[f]$) and the orientation ($q_e$) are quite different for the ROI's. The $D_M[f]$ and $\theta_e$ are 2.59 and 34°, respectively, for the ROI in FIG. 17(a), and the $D_M[f]$ and $\theta_e$ are 2.73 and 149°, respectively, for the ROI in FIG. 17(b). The mechanical strengths are also different, the bone cubes corresponding to the ROI's in FIGS. 17(a) and 17(b) having strengths of 0.93 and 7.47 MPa, respectively. The results of ellipse fitting show that the directional Minkowski dimensions fit to the ellipses very well. The coefficient of determination, $R^2$, used to measure the goodness of fit of the ellipse fitting, yielded a mean of 0.966 with a minimum, maximum, and standard deviation of 0.917, 0.990 and 0.016, respectively. FIG. 17(c) and 17(d) show the fitted ellipse data for the ROI's in FIGS. 17(a) and 17(b), respectively.

Figure 18:
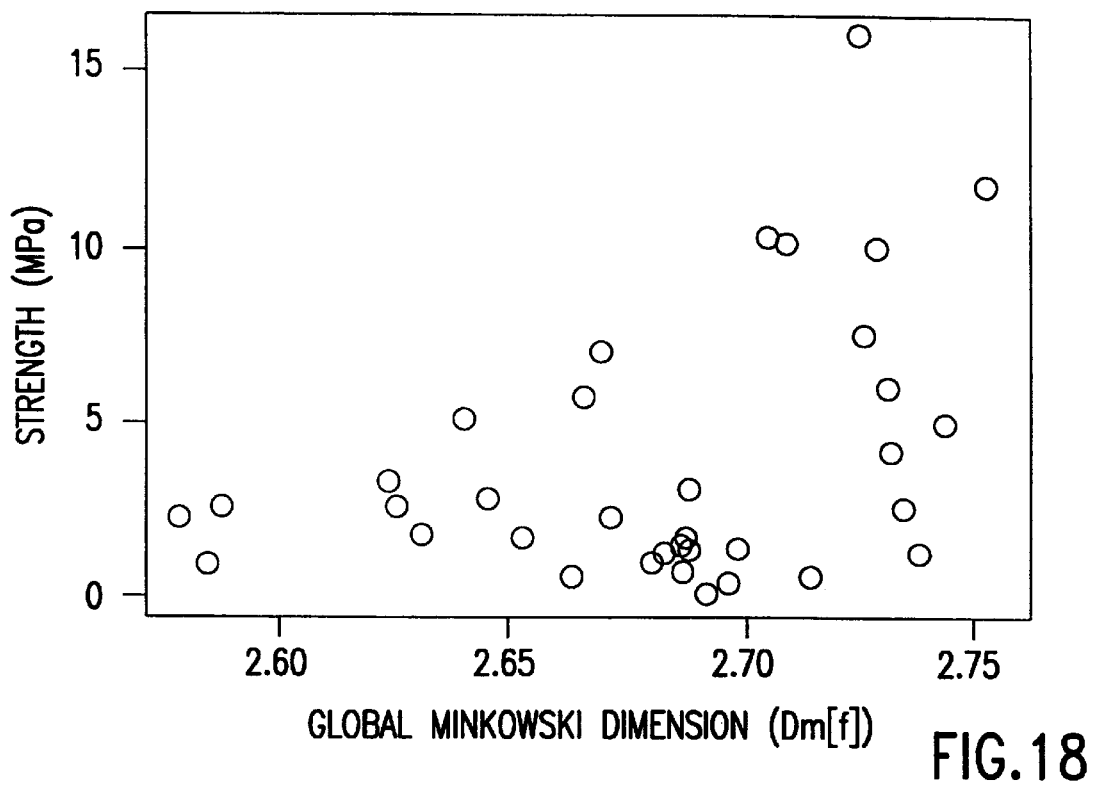
FIG. 18 is a plot showing the relationship between bone strength and global Minkowski dimension where $R^2$=0.17 and p=0.016.

Pearson correlations (r) among the mechanical properties, BMD, and image texture features are shown in Table 4. The following relationships were observed. Among density and structural features, the nBMD[2] had the highest correlation with both strength and modulus; followed by Minkowski dimension, orientation ($\theta_a$), and age in a decreasing order. The relationship between the strength and $D_M[f]$ is shown in FIG. 18. Trabecular bone gets stiffer and stronger with an increase in both BMD and $D_M[f]$ (positive correlation coefficients), and with a decrease in both age and trabecular orientation (negative correlation coefficients). Although $D_M[f]$ had some correlation with BMD, it became quite independent when the BMD was normalized and squared (r=0.30) as suggested by FIG. 19. BMD was found to be nearly uncorrelated with both age and trabecular orientation (r=−0.2). Table 4 shows correlation (Pearson) coefficients among the mechanical properties and the density and computer-extracted structural image features.

TABLE 4

| r | Strength | Modulus | BMD | nBMD | nBMD[2] | Age | $D_M[f]$ | $\theta_a$ | a | b |
|---|---|---|---|---|---|---|---|---|---|---|
| Modulus | 0.92[1] | | | | | | | | | |
| BMD | 0.51[2] | 0.52[2] | | | | | | | | |
| nBMD[2] | 0.58[1] | 0.60[1] | 0.92[1] | | | | | | | |
| Age | 0.63[1] | 0.67[1] | 0.89[1] | 0.95[1] | | | | | | |

TABLE 4-continued

| r | Strength | Modulus | BMD | nBMD | nBMD$^2$ | Age | $D_M[f]$ | $\theta_a$ | a | b |
|---|---|---|---|---|---|---|---|---|---|---|
| $D_M[f]$ | −0.26[4] | −0.36[3] | −0.07[4] | −0.10[4] | −0.12[4] | | | | | |
| $\theta_a$ | 0.41[3] | 0.38[3] | 0.12[3] | 0.31[3] | 0.30[3] | 0.11[4] | | | | |
| a (ellipse major axis) | −0.28[4] | −0.28[4] | −0.14[4] | −0.19[4] | −0.20[4] | 0.22[4] | 0.23[4] | | | |
| a (ellipse major axis) | −0.19[4] | −0.21[4] | −0.19[4] | −0.24[4] | −0.26[4] | −0.31[3] | 0.10[4] | 0.24[4] | | |
| a (ellipse major axis) | 0.02[4] | −0.11[4] | −0.13[4] | −0.08[4] | −0.07[4] | 0.19[4] | −0.01[4] | 0.07[4] | 0.43[2] | |
| e (eccentricity) | −0.23[4] | −0.31[2] | −0.12[4] | −0.22[4] | −0.25[3] | 0.24[3] | 0.09[4] | 0.17[4] | 0.76[1] | −0.24[2] |

Note: [1]p-value < 0.001; [2]p-value < 0.01; [3]p-value <0.1; [4]p-value ≥ 0.1.

Merging of bone mass, bone geometry, bone structure, and/or clinical information to yield estimates of bone strengths Statistical analyses including general linear regression, stepwise regression, best subset selection, and correlation, were performed between the various descriptors of bone quality including BMD, age, computer-extracted radiographic features, and biomechanical properties (S and E). Stepwise regression and best subset selection were used to select and merge the various descriptors of bone mineral density and structural features into a single index, which was then evaluated as a predictor of the biomechanical properties. Although linear combinations of features have been described above, artificial neural networks can also be used to merge the information corresponding to each of the various features, as illustrated in FIG. 1(a) and FIG. 1(b).

For unbiased comparisons, the coefficients of determination were adjusted by the number of predictors and the sample size (Neter et al., 1990 [41]) and the adjusted $R^2$'s were used for all subsequent comparisons. Stepwise regression and best subset were used to select the best predictors for the models (Neter et al., 1990 [41]). From the computer-extracted structural features, the global Minkowski dimension and trabecular orientation were selected as the best structural features in predicting both modulus and strength. In addition to these two structural features and density, patient age was also selected as a good predictor.

Table 5 shows the best regression models and $R^2$'s for predicting the Young's modulus.

The squared relationship using normalized BMD (nBMD$^2$) showed substantial improvement over the model using area BMD directly. By adding more predictors to the model using nBMD$^2$ alone ($R^2$=0.431), one at a time using stepwise regression, the $R^2$'s were improved by 16%, 25%, and 29% using two, three, and four predictors, respectively. By including nBMD$^2$, age, Minkowski dimension, and trabecular orientation into the model, an $R^2$ of 0.554 was achieved. Compared with the model using just area BMD, the four-predictor model (nBMD$^2$, age, $D_M[f]$, $\theta_a$) improved the $R^2$ by more than 120%. Table 5 shows regression equations and the coefficients of determination ($R^2$) between Young's modules (E) and bone density & structural features.

TABLE 5

| Predictors | $R^2$ | $R^2$ (adjusted) | p-value |
|---|---|---|---|
| BMD | 0.274 | 0.251 | <0.002 |
| nBMD | 0.358 | 0.338 | <0.001 |
| nBMD$^2$ | 0.448 | 0.431 | <0.001 |
| nBMD$^2$, $D_M[f]$ | 0.481 | 0.447 | <0.001 |
| nBMD$^2$, Age | 0.531 | 0.501 | <0.001 |
| nBMD$^2$, $D_M[f]$, $\theta$a | 0.525 | 0.477 | <0.001 |

TABLE 5-continued

| Predictors | $R^2$ | $R^2$ (adjusted) | p-value |
|---|---|---|---|
| nBMD$^2$, Age, $D_M[f]$ | 0.583 | 0.541 | <0.001 |
| nBMD$^2$, Age, $D_M[f]$, $\theta$a | 0.608 | 0.554 | <0.001 |

Similar results were also obtained in the regression for the prediction of bone strength as shown in Table 6. Squared relationship using normalized BMD also showed substantial improvement over the model using area BMD directly. Adding more predictors into the model using nBMD$^2$ alone ($R^2$=0.372) improved the $R^2$'s by 5%, 20%, and 29% using two, three, and four predictors, respectively. The highest $R^2$, which was 0.48, was achieved by incorporating nBMD$^2$, age, Minkowski dimension and trabecular orientation into the model. The improvement in $R^2$ using the four-predictor model over the single predictor model of just area BMD was approximately 100%. Table 6 is a regression equations and the coefficients of determination ($R^2$) between strength (S) and bone density & structural features.

TABLE 6

| Predictors | $R^2$ | $R^2$ (adjusted) | p-value |
|---|---|---|---|
| BMD | 0.261 | 0.238 | <0.002 |
| nBMD | 0.340 | 0.319 | <0.001 |
| nBMD$^2$ | 0.391 | 0.372 | <0.001 |
| nBMD$^2$, $D_M[f]$ | 0.445 | 0.409 | <0.001 |
| nBMD$^2$, Age | 0.426 | 0.389 | <0.001 |
| nBMD$^2$, $D_M[f]$, $\theta$a | 0.501 | 0.451 | <0.001 |
| nBMD$^2$, Age, $D_M[f]$ | 0.496 | 0.446 | <0.001 |
| nBMD$^2$, Age, $D_M[f]$, $\theta$a | 0.538 | 0.480 | <0.001 |

In Tables 5 and 6, the best two- and three-predictor models without using patient age are also presented. For predicting Young's modulus, both two- and three-predictor models with age performed better than models that did not use age. However, for predicting strength, the models without age performed slightly better than the models with age. For both modulus and strength, adding more predictors into the four-predictor models made a negligible improvement in the models' predictive power. Positive regression coefficients for density and Minkowski dimension were found for all models, and negative regression coefficients for age and orientation were found for all models. Residual analyses showed that the data used in all models were nearly normally distributed and had a random nature.

An attempt was made to integrate a normalized BMD (representing volumetric BMD) with computer-extracted structural features to yield a potentially relevant method for bone quality evaluation. The results of the attempt suggest the potential of using these bone features for clinical application since good correlation with bone strength was obtained.

Among all features investigated, bone density was the strongest single predictor in the prediction of bone mechanical properties (Table 1). Normalization of area BMD with bone size has been shown to be very important, and the power law relationship (i.e., nBMD$^2$) further improved the correlation between bone strength and density.

Among the fractal-based structural features evaluated, the global Minkowski dimension, $D_M[f]$, yielded the highest predictor for bone mechanical properties. The global Minkowski dimension, in principle, characterizes the textural roughness of an image. The textural roughness is a function of the trabecular elements projected onto the X-ray image plane. Therefore, trabecular bone with a higher global Minkowski dimension or rougher image texture is healthier and stronger.

Trabecular bone possesses strong anisotropy and bone mechanical properties are related to trabecular orientation. Thus, trabecular bone is expected to be stiffer and stronger in the direction where most trabecular elements are aligned, but more susceptible to crushing in other directions. Although three-dimensional trabecular orientation of in vitro bone (Jiang et al. (1998b) [34]), is more closely related to bone strength, such methods are invasive or destructive. With the present invention, texture orientation, as calculated from a projection radiograph (i.e. from a two-dimensional image), was used to characterize the three-dimensional orientation of the trabecular network. The results suggest that the texture orientation extracted from a radiograph is related to bone strength, and the global Minkowsici dimension and texture orientation together, better describe trabecular structure.

Figure 19:
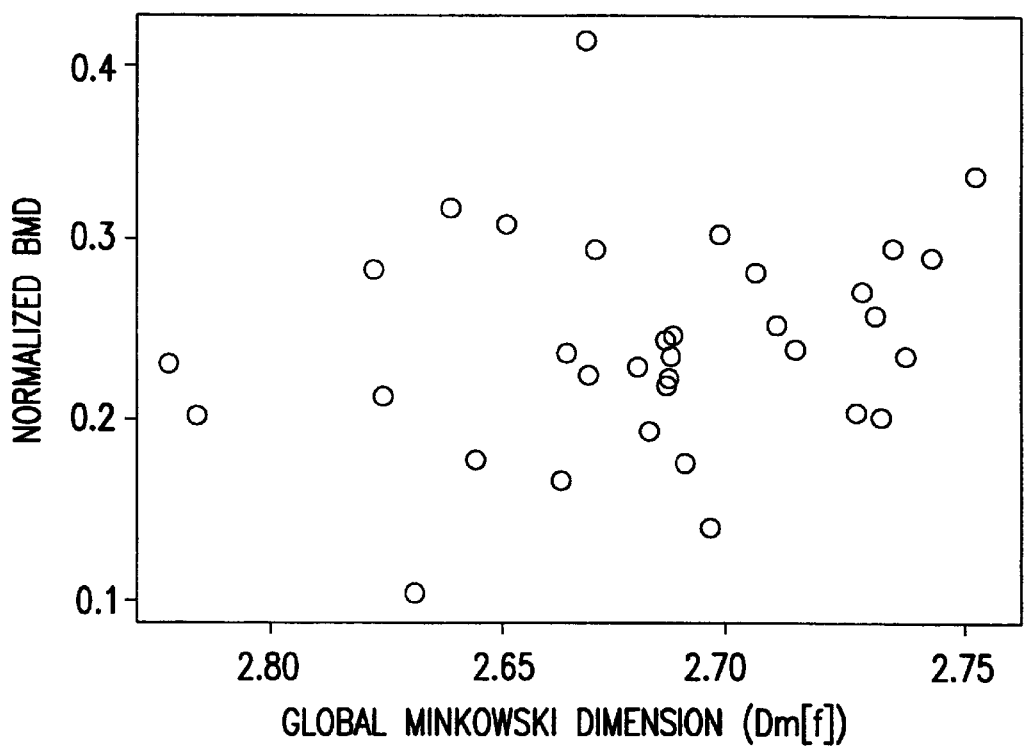
FIG. 19 is a graph showing the relationship between $nBMD^2$ and $D_M[f]$ where $R^2$=0.04 and p=0.10.

Using multiple-predictor models, analysis of the database in accordance with the present invention showed that both density and structural features contribute to bone mechanical properties. Although bone density is the most important feature, only a portion of the variability in bone modulus and strength can be explained by the normalized BMD (i.e., volumetric BMD). The structural features extracted from bone radiographs and age explain the additional variation in bone quality that can not be explained by bone density alone. Age may contain additional information on mechanical properties that cannot be explained by either the noninvasively measured density and/or structural predictors. The independence of the structural features from bone density as seen in FIG. 19 and the progressively improved $R^2$'s in the multi-predictor models validate the importance of the inventive models.

The resultant $R^2$'s in this example were lower than those reported in literature as summarized by Keaveny and Hayes (1993) [9]. Several factors may be responsible for this difference. First, the whole bone thickness was used to measure bone mineral density. Even though area BMD is normalized, the volumetric density is a gross measure because it integrates bone minerals from the entire thickness of the femoral neck which includes cortical bone. Note, however, that bone mechanical properties were only obtained from the trabecular bone cubes. Therefore, the measured BMD of the femoral neck is not exactly the BMD of the bone cubes. Second, although careful attention is given to matching the locations for measuring BMD, selecting the ROI on the radiographs, and machining bone cubes, it is impossible to match these locations exactly. Because the amount of trabecular bone and trabecular arrangement may vary dramatically in the neck region, slight mismatching could change the actual BMD,$D_M[f]$ and/or trabecular orientation. Third, to estimate trabecular orientation, it was assumed that the femoral neck axis as measured from the pelvic radiograph coincided with the loading direction in the mechanical testing. However, due to anteversion and rotation shown on the radiograph and the presence of osteophytes around the neck in some of the cases, the femoral neck axis measured from the pelvic radiograph potentially may not agree with the direction for mechanical testing. Such misalignment can introduce error in the estimation of trabecular orientation, and therefore decrease the predictive power of trabecular orientation.

Analysis of fractal-based systems using artificial neural networks

The fractal dimension of the bone ROIs can be estimated by the Minkowski Dimension, as discussed above, or by using a surface area technique, as described elsewhere (Caliguiri et al., 1994) [44]. In the surface area based technique, the gray level of each pixel is regarded as a "height" with pixel size as "length" and "width" to calculate a "surface area" for each ROI. Adjacent pixels are then combined to yield an effectively larger pixel size with a new gray level averaged from these combined pixels. A new "surface area" is then calculated for each ROI, and the process is successively repeated, combining adjacent pixels from earlier steps, and calculating the resultant surface area for each new effective pixel size (FIG. 20). The fractal dimension (D) for each ROI is calculated using D=2−H, where H is the slope of a least-squares line fitted to the relationship of log surface area versus log pixel size for each ROI. The number 2 is the topological dimension of the gray level surface.

Figure 20A:
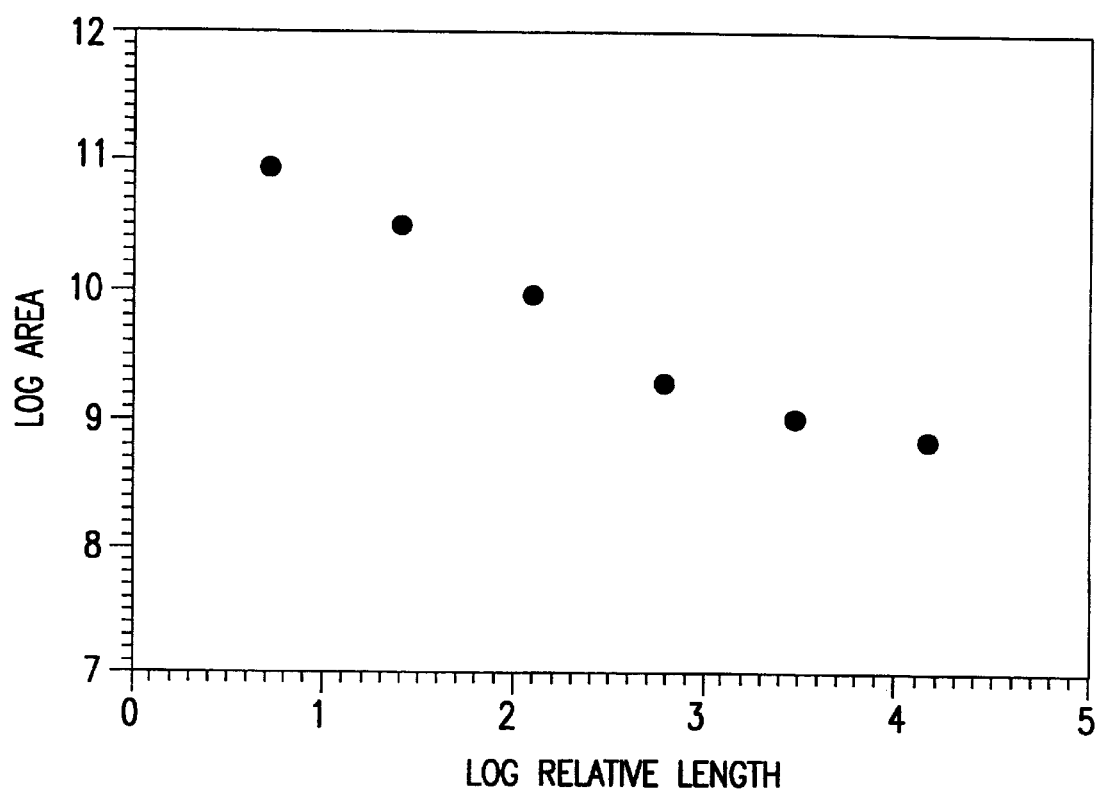
FIG. 20(a) is a graph showing the relationship between log area and log relative length from the surface area fractal analysis of an ROI.
Figure 20B:
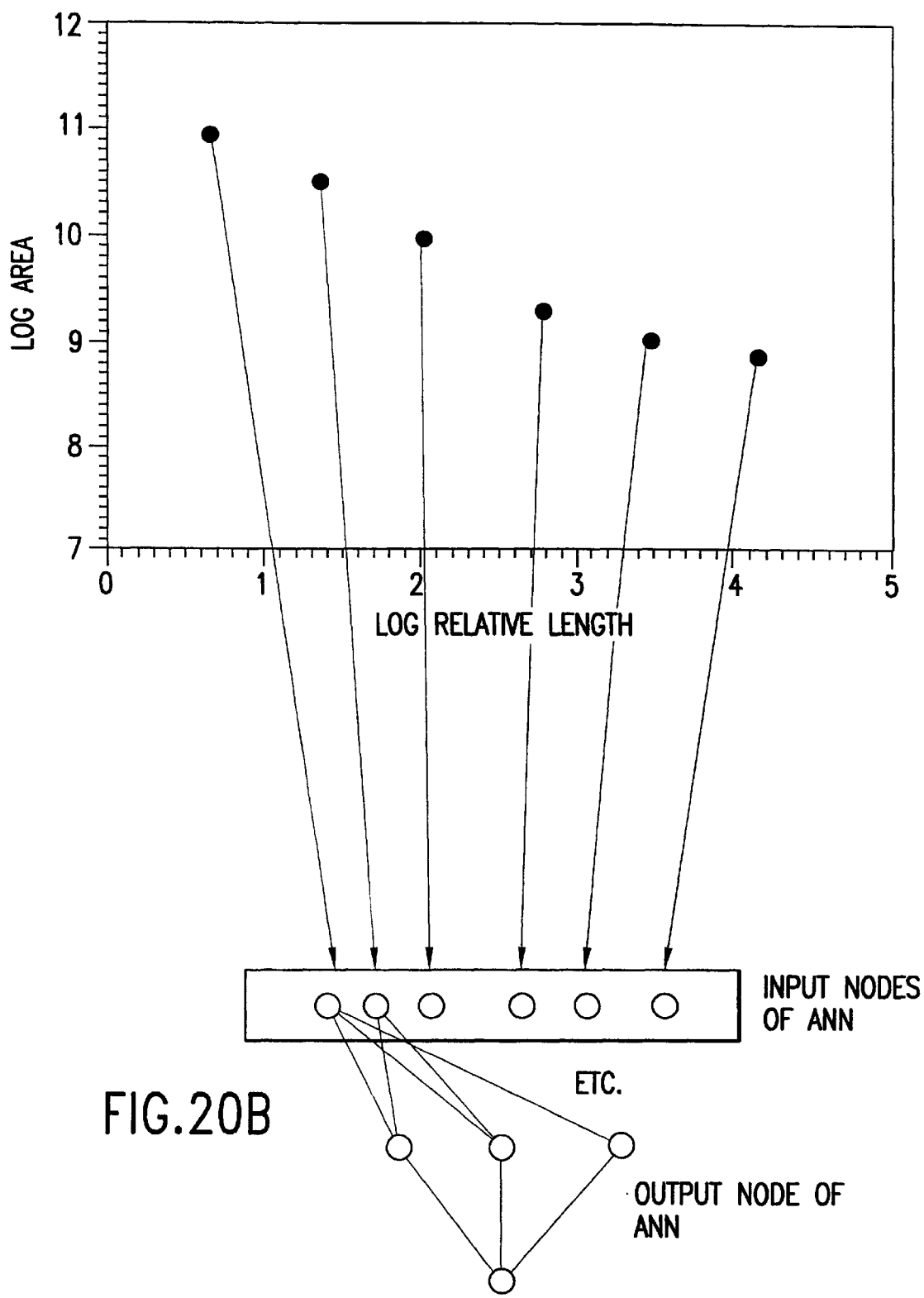
FIG. 20(b) is an illustration showing how the data from the graph in FIG. 20(a) are used as inputs for an artificial neural network (ANN)
Figure 21:
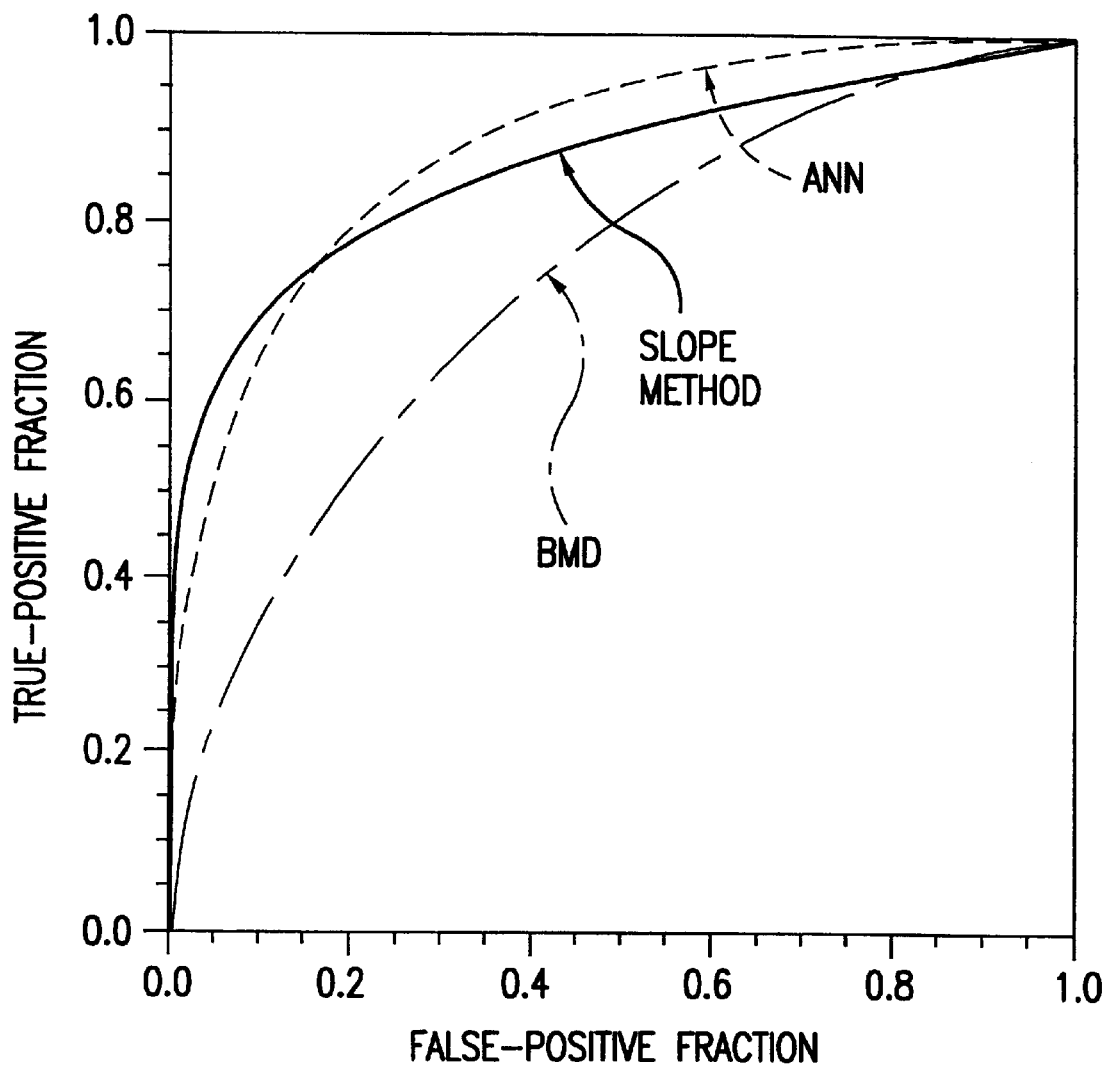
FIG. 21 is a graph showing ROC curves that illustrate the relative performances of the conventional fractal analysis method, the ANN method, and bone mass alone, for distinguishing between strong and weak bone.

With both of these fractal based technique, one is required to determine a slope (FIG. 12) or multiple slopes (FIG. 20b) if the texture is multifractal in nature. This may be difficult due to the number of limited data points used in determining the slope (see FIGS. 12 and 20(a). However, we present here a technique for the incorporation of an ANN to determine the fractal nature of the texture and relate it to bone strength and risk of fracture. A feed-forward back-propagation neural network is demonstrated for the surface-area technique. (Similar use can be performed with the Minkowski dimension volume technique.) The data points from the surface area vs. effective pixel size plot of FIG. 20(a) are used as the input nodes to an ANN as shown in FIG. 20(b) (six input nodes are used in this example). There exists one hidden layer with three nodes and a single output node trained on the truth data, i.e., the bone mechanical strength data. Continuous load-to-failure data are used as the desired output for the ANN. Using round-robin testing, specimens were classified as strong or weak based on the load-to-failure values. Table 7 shows the correlation of the conventional calculation of slope method and the ANN method with load-to-failure, which yields correlation coefficients of −0.53 and 0.77, respectively. The correlation of bone mass (BMD) with strength is also given (0.51) for comparison. Table 8 and FIG. 21 show the performances of the conventional fractal method and the new ANN method in terms of ROC analysis. A cutoff of 300 Newtons was used to divide the specimens into 7 strong and 27 weak bones. Again, the ANN method of extracting the fractal dimension from the surface (or volume) plots outperformed the conventional method as well as the use of BMD alone. These results indicate that computerized texture analysis of trabecular bone pattern on digitized radiographs can provide information on bone strength. A statistically significant improvement over BMD was found using a fractal-based neural network system in the task of distinguishing between strong and weak bone.

TABLE 7

Correlation with load to failure

| Method | Correlation with strength | p-value |
| --- | --- | --- |
| Slope Method | −0.53 | 0.0010 |
| ANN | 0.77 | <0.0001 |
| BMD | 0.51 | 0.0018 |

TABLE 8

In distinguishing between strong and weak bone

| Method | $A_z$ | p-value* |
| --- | --- | --- |
| Slope Method | 0.85 ± 0.06 | 0.126 |
| ANN | 0.88 ± 0.07 | 0.007 |
| BMD | 0.72 ± 0.11 | — |

*p-value in comparison with BMD

Computer Implementation

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art.

The present invention includes a computer program product which is a storage medium including instructions which can be used to program a computer to perform processes of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media, including hard drives, suitable for storing electronic instructions.

Figure 23:
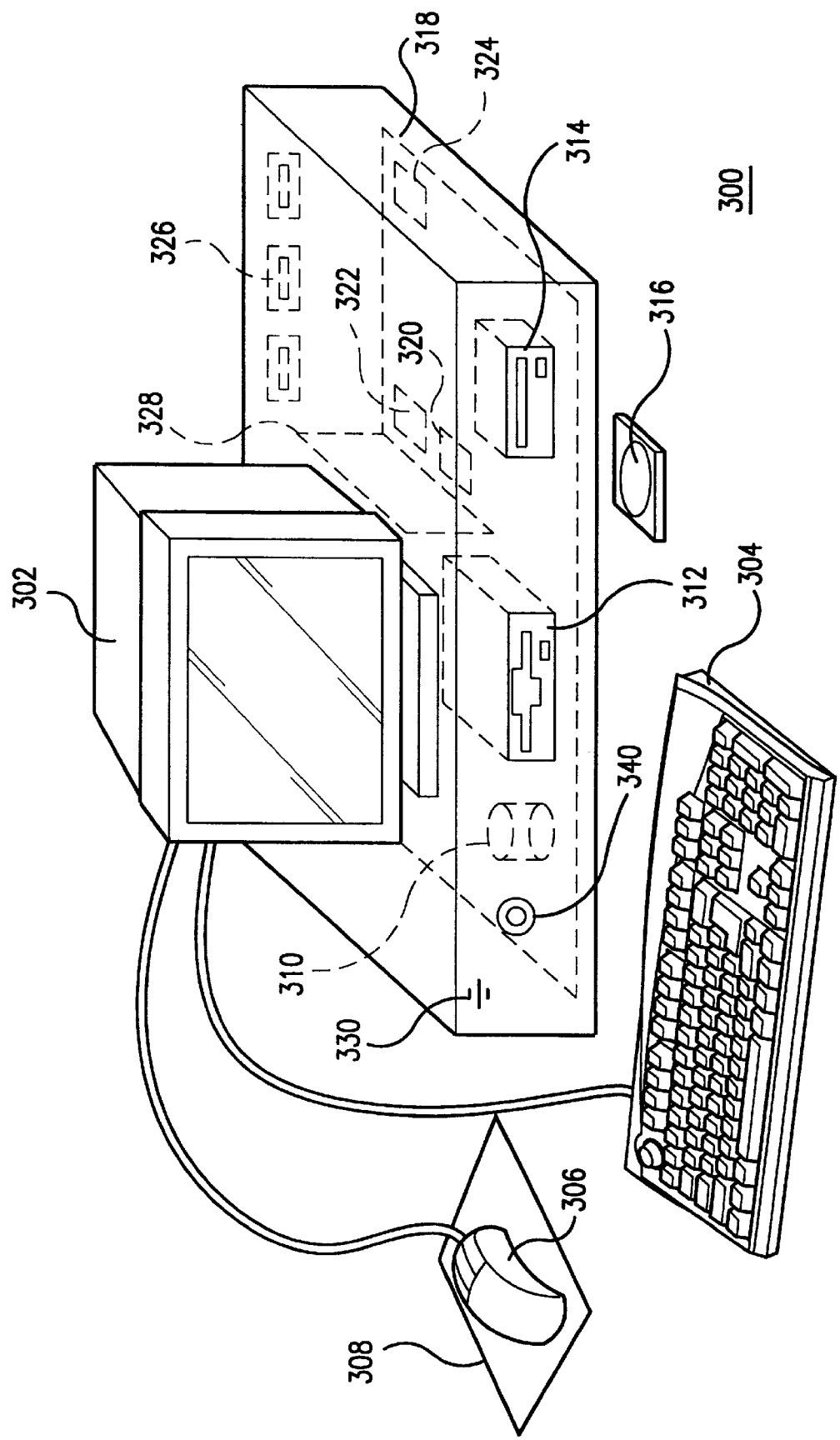
FIG. 23 is a schematic illustration of a general purpose computer 300 programmed according to the teachings of the present invention.

FIG. 23 is schematic diagram of a general purpose computer 300 which can be used to implement the present invention. In FIG. 23, the computer 300, for example, includes a display device 302 (such as a touch screen monitor with a touch-screen interface), a keyboard 304, a pointing device 306, a mouse pad or digitizing pad 308, a hard disk 310 (or other fixed, high density media drives, connected using an appropriate device bus, such as a SCSI bus, an Enhanced IDE bus, a PCI bus, etc.), a floppy drive 312, a tape or CD ROM drive 314 with tape or CD media 316 (or other removable media devices, such as magneto-optical media, etc.), and a mother board 318. The motherboard 318 includes, for example, a processor 320, a RAM 322, and a ROM 324. The computer 300 also includes I/O ports 326 and optional specialized hardware 328 for performing specialized hardware/software functions (such as sound processing, image processing, signal processing, neural network processing, etc.), a microphone 330, and a speaker or speakers 340.

Stored on any one of the above described storage media (computer readable media), the present invention includes programming for controlling both the hardware of the computer 300 and for enabling the computer 300 to interact with a human user. Such programming may include, but is not limited to, software for implementation of device drivers, operating systems, and user applications. Such computer readable media further includes programming or software instructions to direct the general purpose computer 300 to perform tasks in accordance with the present invention.

The programming of general purpose computer 300 may include a software module for digitizing and storing images obtained from an image acquisition device. Alternatively, it should be understood that the present invention can also be implemented to process digital image data obtained by other means, for example from a PACS.

The invention may also be implemented by the preparation of application specific integrated circuits or by interconnecting an appropriate network of conventional component circuits, as will be readily apparent to those skilled in the art.

In clinical application, because of bone size variation, it is impossible to measure true volumetric BMD with DXA. Nevertheless, for the purpose of comparing individuals with different bone sizes, it is possible to normalize the area-based BMD with a geometric dimension that is proportional to bone thickness in a noninvasive manner. In the present invention, area-based BMD and volumetric BMD are used as predictors of bone mechanical properties. Further a method for noninvasively normalizing the BMD values for use in clinical applications is provided.

The present invention provides a new and improved method and system for the analysis of bone. Specific applications are given for the analysis of regions within the femoral hip. The techniques employed include novel features that characterize the volumetric bone mineral density (BMD) of bone and allow extraction of bone geometry features. The techniques also include incorporation of Minkowski Dimension in the analysis of the bone structure pattern and extraction of information from fractal-based texture analyses. These features of bone mass, bone geometry, bone structure, and/or subject age are then merged using artificial neural networks in order to yield an estimate of bone strength. Incorporation of these features make the system desirable for in vivo screening (for osteoporosis, bone strength, and risk of future fracture).

The results obtained from implementing the present invention demonstrate the important contributions of normalized BMD, structural features, and age to bone mechanical properties, e.g., bone strength. In addition, the limitation of fractal-based analyses is overcome with the use of an ANN to extract fractal information.

Obviously, numerous modifications and variations of the present invention are possible in light of the above technique. It is therefore to be understood that within the scope of the appended claims, the invention may be practiced otherwise than as specifically described herein. Although the current application is focused on radiographic medical images, the concept can be expanded to analysis in other images of the human body.

APPENDIX

References:
[1] Adams, J. E. Single and dual energy X-ray absorptiometry. Eur. Radiol. 7(suppl. 2):S20–S31; 1997.
[2] Beck, T. J., Ruff, C. B., Warden, K. E., Scott, W. W. and Rao, G. U. Predicting femoral neck strength from bone mineral data, a structural approach. Investigative Radiology 25:6–18; 1989.
[3] Cann, C. E., Genant, H. K., Kolb, F. O. and Ettinger, B. Quantitative computed tomography for the prediction of vertebral body fracture risk. Bone 6:1–7; 1985.
[4] Carter, D. and Haye, W. The compressive behavior of bone as a two-phase porous structure. J. Bone Joint Surg. 59A:954–962; 1977.
[5] Carter, D. R., Bouxsein, M. L. and Marcus, R. New approaches for interpreting projected bone densitometry data. J. Bone Miner. Res. 7:137–145; 1992.

[6] Faulkner, K. T., McClung P. and Cummings S. E. Automated evaluation of hip axis length of predicting hip fracture. J. Bone Miner. res. 9:1065ζ1070; 1994.

[7] Grampp, S., Genant, H. K., Mathur, A., Lang, P., Jergas, M., Takada, M., Gluer C. C., Lu, Y. and Chavez, M. Comparison of noninvasive bone mineral measurements in assessing age-related loss, fracture discrimination, and diagnostic classification. J. Bone Miner. Res. 12:697–711; 1997.

[8] Karlsson, K. M., Sembo, I., Obrant, K. J., Redlund-Johnell, I. and Johnell, O. Femoral neck geometry and radiographic signs of osteoporosis as predictors of hip fracture. Bone 18:327–330; 1996.

[9] Keaveny, T. M. and Hayes, W. C. A 20-year perspective on the mechanical properties of trabecular bone, Trans. of ASME 115: 534 542; 1993.

[10] Lang, T. F. Summary of research issues in imaging and noninvasive bone measurement. Bone 22:159S–160S; 1998.

[11] Martin, R. and Burr, D. Non-invasive measurement of long bone cross-sectional moment of inertia by photon absorptiometry. J. Biomech. 17:195–201; 1984.

[12] McBroom, R., Hayes, W., Edwards, W., Goldberg, R. and White, A. Prediction of vertebral body compressive fracture using quantitative computed tomography. J. Bone Joint Surg. 67A: 1206–1214; 1985.

[13] Nielesn, H., Mosekilde, L., Melsen, B., Christensen, P. and Melsen, F. Relations of bone mineral content, ash weight and bone mass: implications for correction of bone mineral content for bone size. Clin. Orthop. 153: 241–247; 1980.

[14] Ross, P. D., Davis, J. W., Vogel J. M. and Wasnich R. D. A critical review of bone mass and the risk of fracture in osteoporosis. Calcif. Tissue Int. 46:149–161; 1990.

[15] Sartoris, D. J. and Resnick, D. Current and innovation methods for noninvasive bone densitometry. Radiologic Clinics of North America 28:257–278; 1990.

[16] Seeman, E. Editorial: Growth in bone mass and size-are racial and gender differences in bone mineral density more apparent than real? J. Clin. Endocrinol. Metab. 83:1414–1419; 1998.

[17] Sieranen, H., Kannus, P., Oja, P. and Vuori, I. Dual-energy X-ray absorptiometry is also an accurate and precise method to measure the dimensions of human long bones. Calcif. Tissue Int. 54: 101–105; 1994.

[18] R. S. A. Acharya, A. LeBlanc, L. Shackelford, V. Swarnarkar, R. Krishnamurthy, E. Hausman and C. Lin, "Fractal analysis of bone structure with application to osteoporosis and microgravity effects," SPIE 2433, 388–403 (1995).

[19] C. L. Benhamou, E. Lespessailles, G. Jacquet, R. Harba, R. Jennane, T. Loussot, D. Tourliere and W. Ohley, "Fractal organization of trabecular bone images on calcaneus radiographs," J. Bone and mineral research 9, 1909–1918 (1994).

[20] S. M. Bentzen, I. Hvid and J. Jorgensen, "Mechanical strength of tibial trabecular bone evaluation by x-ray computed tomography," J. Biomech. 20, 743–752 (1987).

[21] G. H. Brandenburger, "Clinical determination of bone quality: is ultrasound an answer," Calcif. Tissue Int. 53, S151–S156 (1990).

[22] P. Caligiuri, M. L. Giger, M. J. Favus, H. Jia, K. Doi, and L. B. Dixon, "Computerized radiographic analysis of osteoporosis: preliminary evaluation," Radiology 186, 471–474 (1993).

[23] D. A. Chakkalakl, L. Lippiello, R. F. Wilson, R. Shindell and J. F. Connolly, "Mineral and matrix contributions to rigidity in fracture healing," J. Biomech. 23, 425–434 (1990).

[24] S. C. Cowin, W. C. Van Buskirk and R. B. Ashman, "Properties of bone," In Handbook of Bioengineering: edited by R. Skalak and S. Chien, 2.1–2.28, (McGraw-Hill, N.Y., 1987).

[25] P.I. Croucher, N. J. Garrahan and J. E. Compston, "Assessment of cancellous bone structure: comparison of strut analysis, trabecular bone pattern factor, and marrow space star volume," J. Bone Miner. Res. 11, 955–961 (1996).

[26] E. P. Durand and P. Ruegsegger, "High-contrast resolution of CT images for bone structure analysis," Med. Phys. 19, 569–573 (1992).

[27] J. C. Elliott, P. Anderson, R. Boakes and S. D. Dover, "Scanning X-ray microradiography and microtomography of calcified tissue," In Calcified Tissue: edited by D. W. L. Hukins, (CRC Press, inc. Boca Raton, Fla., 1989).

[28] K. G. Faulkner, C. Gluer, S. Majumdar, P. Lang, K. Engelke and H. K. Genant, "Noninvasive measurements of bone mass, structure, and strength: current methods and experimental techniques," AJR 157, 1229–1237 (1991).

[29] A. Feldkamp, S. A. Goldstein, A. M. Parfitt, G. Jesion, and M. Kleerekoper, "The direct examination of three-dimensional bone architecture in vitro by computed tomography," J. Bone Miner. Res. 4, 3–11 (1989).

[30] S. A. Goldstein, "The mechanical properties of trabecular bone: dependence on anatomical location and function," J. Biomech. 20, 1055–1061 (1987).

[31] R. W. Goulet, S. A. Goldstein, M. J. Ciarelli, J. L. Kuhn, M. B. Brown and L. A. Feldkamp, "The relationship between the structural and orthogonal compressive properties of trabecular bone," J. Biomech. 27, 375–389 (1994).

[32] I. Hvid, S. M. Bentzen, F. Linde, L. Mosekilde and B. Pongsoipetch, "X-ray quantitative computed tomography: the relations to physical properties of proximal tibial trabecular bone specimens," J. Biomech. 22, 837–944 (1989).

[33] C. Jiang, R. E. Pitt, J. E. A. Bertram, and D. J. Aneshansley, "Fractal-based image texture analysis of trabecular bone architecture," Medical & Biological Engineering & Computing, Submitted (1998a).

[34] C. Jiang, R. E. Pitt, J. E. A. Bertram, and D. J. Aneshansley, "Fractal characterization of trabecular bone structure and its relation to mechanical properties," J. Biomech., Submitted (1998b).

[35] S. Katsuragawa, K. Doi. and H. MacMahon, "Image feature analysis and computer-aided diagnosis in digital radiograph: detection and characterization of interstitial lung disease in digital chest radiographs," Medical Physics 15:311–319 (1988).

[36] T. M. Keaveny, E. F. Wachtel, C. M. Ford and W. C. Hayes, "Differences between the tensile and compressive strengths of bovine tibial trabecular bone depend on modulus," J. Biomech. 27, 1137–1146 (1994).

[37] S. Majumder, R. S. Weinstein and R. R. Prasad, "Application of fractal geometry techniques to the study of trabecular bone," Med. Phys. 20, 1611–1619 (1993).

[38] S. Majumder, M. Kotharl, P. Augat, D. C. Newitt, T. M. Link, J. C. Lin, T. Lang, Y. Lu and H. K. Genant, "High-resolution magnetic resonance imaging: three-dimensional trabecular bone architecture and biomechanical properties," Bone 55, 445–454 (1998).

[39] B. B. Mandelbrot, The fractal geometry of nature, (Freeman, San Francisco, Calif., 1982).

[40] P. Maragos, "Fractal signal analysis using mathematical morphology," Advances in Electronics and Electron Physics 88, 199–246 (1994).

[41] J. Neter, W. Wasserman and M. H. Kuter, Applied linear statistical models (3rd edition), (Richard D. Irwin, Inc., 1990).

[42] J. Serra, *Image Analysis and Mathematical Morphology.* (Academic, London, 1982).

[43] W. J. Whitehouse, "The quantitative morphology of anisotropic trabecular bone," J. Microsc. 101, 153–168 (1974).

[44] Caligiuri P., Giger M. L., Favus M., "Multifractal Radiographic Analysis of Osteoporosis," Medical Physics 21: 503–508, 1994.

[45] F. Linde, C. B. Gothgen, I. Hvid, B. Pongsoipetch, and S. Bentzen, "Mechanical properties of trabecular bone by a non-destructive compressive testing approach," Eng.Med. 17, 23–29 (1988).

What is claimed as new and desired to be secured by Letters Patent of the United States is:

1. A method for the analysis of bone, comprising:

obtaining digital image data corresponding to an image of the bone;

determining, based on said digital image data of the bone, a Minkowski Dimension; and estimating the strength of the bone based upon the Minkowski Dimension.

2. The method of claim 1, wherein:

said determining step comprises determining bone mineral density (BMD); and said estimating step comprises estimating the strength of the bone based at least in part upon the determined BMD.

3. The method of claim 1, further comprising:

inputting subject data; and wherein said estimating step comprises estimating the strength of the bone based at least in part upon the input subject data.

4. The method of claim 3, wherein said inputting step comprises:

inputting the age of the patient whose bone is being analyzed as said subject data.

5. The method of claim 1, further comprising:

determining both of the Minkowski Dimension for the bone and the trabecular orientation of the bone;

inputting subject data of the patient whose bone is being analyzed; and the step of estimating comprising estimating bone strength based on the measure of the Minkowski Dimension, the trabecular orientation, and the subject data.

6. The method of claim 5, wherein:

said determining step comprises determining bone mineral density (BMD); and said estimating step comprises estimating the strength of the bone based at least in part upon the determined BMD.

7. The method of claim 1, further comprising:

predicting the likelihood of bone fracture from the estimation of bone strength.

8. The method of claim 6, further comprising:

predicting the likelihood of bone fracture from the estimation of bone strength.

9. The method of claim 2, wherein the step of determining the BMD comprises:

determining an area-based BMD as the measure of BMD.

10. The method of claim 2, wherein:

the determining step comprises determining a normalized BMD corresponding to a volumetric bone mineral density of the bone as the measure of BMD; and the estimating step comprises estimating the strength of the bone based at least in part on the normalized BMD.

11. The method of claim 10, wherein the step of determining the normalized BMD comprises:

determining an area-based BMD of the bone;

performing bone geometry analysis to generate a measure of bone geometry; and determining the normalized BMD from the area-based BMD and the measure of bone geometry.

12. The method of claim 11, wherein the step of performing bone geometry analysis comprises:

determining a neck width of the bone.

13. The method of claim 11, wherein the step of performing bone geometry analysis comprises:

determining a shaft width of the bone.

14. The method of claim 1, further comprising:

selecting a region of interest (ROI) within the bone;

performing texture analysis of the image data within the ROI to determine at least one measure of bone structure; and the estimating step comprising estimating the strength of the bone based at least in part on the at least one measure of bone structure.

15. The method of claim 14, wherein the step of performing texture analysis comprises:

extracting fractal characteristics of the image data within the ROI using an artificial neural network, said at least one measure of bone structure including the fractal characteristics.

16. The method of claim 14, wherein the step of performing texture analysis comprises:

determining a directional Minkowski Dimension for the image data within the ROI, said at least one measure of bone structure including the directional Minkowski Dimension.

17. The method of claim 14, wherein the step of performing texture analysis comprises:

determining a trabecular orientation for the image data within the ROI, said at least one measure of bone structure including the trabecular orientation.

18. The method of claim 10, further comprising:

predicting the likelihood of bone fracture from the estimation of bone strength.

19. A computer readable medium storing computer instructions for the analysis of bone, by performing the steps of:

obtaining digital image data corresponding to an image of the bone;

determining, based on said digital image data of the bone, a Minkowski Dimension; and estimating the strength of the bone based upon the Minkowski Dimension.

20. The computer readable medium of claim 19, wherein:

said determining step comprises determining bone mineral density (BMD); and said estimating step comprises estimating the strength of the bone based at least in part upon the determined BMD.

21. The computer readable medium of claim 19, further storing instructions for performing the steps of:

inputting subject data; and wherein said estimating step comprises estimating the strength of the bone based at least in part upon the input subject data.

22. The computer readable medium of claim 21, wherein said inputting step comprises:

inputting the age of the patient whose bone is being analyzed as said subject data.

23. The computer readable medium of claim 19, further storing instructions for performing the steps of:

determining both of the Minkowski Dimension for the bone and the trabecular orientation of the bone;

inputting subject data of the patient whose bone is being analyzed; and the step of estimating comprising estimating bone strength based on the measure of the Minkowski Dimension, the trabecular orientation, and the subject data.

24. The computer readable medium of claim 23, wherein said determining step comprises determining BMD and said estimating step comprises estimating the strength of the bone based at least in part upon the determined BMD.

25. The computer readable medium of claim 19, further storing instructions for performing the steps of:

predicting the likelihood of bone fracture from the estimation of bone strength.

26. The computer readable medium of claim 24, further storing instructions for performing the steps of:

predicting the likelihood of bone fracture from the estimation of bone strength.

27. The computer readable medium of claim 20, wherein the step of determining the BMD comprises:

determining an area-based BMD as the measure of BMD.

28. The computer readable medium of claim 20, wherein:

the determining step comprises determining a normalized BMD corresponding to a volumetric bone mineral density of the bone as the measure of BMD; and the estimating step comprises estimating the strength of the bone based at least in part on the normalized BMD.

29. The computer readable medium of claim 28, wherein the step of determining the normalized BMD comprises:

determining an area-based BMD of the bone;

performing bone geometry analysis to generate a measure of bone geometry; and determining the normalized BMD from the area-based BMD and the measure of bone geometry.

30. The computer readable medium of claim 29, wherein the step of performing bone geometry analysis comprises:

determining a neck width of the bone.

31. The computer readable medium of claim 29, wherein the step of performing bone geometry analysis comprises:

determining a shaft width of the bone.

32. The computer readable medium of claim 19, further storing instructions for performing the steps comprising:

selecting a region of interest (ROI) within the bone;

performing texture analysis of the image data within the ROI to determine at least one measure of bone structure; and the step of estimating comprising estimating the strength of the bone based at least in part on the at least one measure of bone structure.

33. The computer readable medium of claim 32, wherein the step of performing texture analysis comprises:

extracting fractal characteristics of the image data within the ROI using an artificial neural network, said at least one measure of bone structure including the fractal characteristics.

34. The computer readable medium of claim 32, wherein the step of performing texture analysis comprises:

determining a directional Minkowski Dimension for the image data within the ROI, said at least one measure of bone structure including the directional Minkowski Dimension.

35. The computer readable medium of claim 32, wherein the step of performing texture analysis comprises:

determining a trabecular orientation for the image data within the ROI, said at least one measure of bone structure including the trabecular orientation.

36. The computer readable medium of claim 28, further storing instructions for performing the steps comprising:

predicting the likelihood of bone fracture from the estimation of bone strength.

37. A system for the analysis of bone, comprising:

a mechanism configured to obtain digital image data corresponding to an image of the bone;

a mechanism configured to determine, based on said digital image data of the bone, a Minkowski Dimension; and a mechanism configured to estimate the strength of the bone based upon the Minkowski Dimension.

38. The system of claim 37, wherein:

said determining mechanism comprises a mechanism configured to determine bone mineral density (BMD); and said estimating mechanism comprises a mechanism configured to estimate the strength of the bone based at least in part upon the determined BMD.

39. The system of claim 37, further comprising:

a mechanism configured to input subject data; and wherein said estimating mechanism comprises a mechanism configured to estimate the strength of the bone based at least in part upon the input subject data.

40. The system of claim 39, wherein said inputting mechanism comprises:

a mechanism configured to input the age of the patient whose bone is being analyzed as said subject data.

41. The system of claim 37, further comprising:

a mechanism configured to determine both of the Minkowski Dimension for the bone and the trabecular orientation of the bone; and a mechanism configured to input subject data of the patient whose bone is being analyzed;

wherein the estimating mechanism comprises a mechanism configured to estimate bone strength based on the measure of the Minkowski Dimension, the trabecular orientation, and the subject data.

42. The system of claim 41, wherein:

said determining mechanism comprises a mechanism configured to determine bone mineral density (BMD); and said estimating mechanism comprises a mechanism configured to estimate the strength of the bone based at least in part upon the determined BMD.

43. The system of claim 37, further comprising:

a mechanism configured to predict the likelihood of bone fracture from the estimation of bone strength.

44. The system of claim 42, further comprising:

a mechanism configured to predict the likelihood of bone fracture from the estimation of bone strength.

45. The system of claim 38, wherein the mechanism configured to determine BMD comprises:
  a mechanism configured to determine an area-based BMD as the measure of BMD.

46. The system of claim 38, wherein the determining mechanism comprises:
  a mechanism configured to determine a normalized BMD corresponding to a volumetric bone mineral density of the bone as the measure of BMD; and
  wherein the estimating mechanism comprises a mechanism configured to estimate the strength of the bone based at least in part on the normalized BMD.

47. The system of claim 46, wherein the mechanism configured to determine the normalized BMD comprises:
  a mechanism configured to determine an area-based BMD of the bone;
  a mechanism configured to perform bone geometry analysis to generate a measure of bone geometry; and
  a mechanism configured to determine the normalized BMD from the area-based BMD and the measure of bone geometry.

48. The system of claim 47, wherein the mechanism configured to perform bone geometry analysis comprises:
  a mechanism configured to determine a neck width of the bone.

49. The system of claim 47, wherein the mechanism configured to perform bone geometry analysis comprises:
  a mechanism configured to determine a shaft width of the bone.

50. The system of claim 37, further comprising:
  a mechanism configured to select a region of interest (ROI) within the bone; and
  a mechanism configured to perform texture analysis of the image data within the ROI to determine at least one measure of bone structure;
  wherein the mechanism configured to estimate comprises a mechanism configured to estimate the strength of the bone based at least in part on the at least one measure of bone structure.

51. The system of claim 50, wherein the mechanism configured to perform texture analysis comprises:
  a mechanism configured to extract fractal characteristics of the image data within the ROI using an artificial neural network, said at least one measure of bone structure including the fractal characteristics.

52. The system of claim 50, wherein the mechanism configured to perform texture analysis comprises:
  a mechanism configured to determine a directional Minkowski Dimension for the image data within the ROI, said at least one measure of bone structure including the directional Minkowski Dimension.

53. The system of claim 50, wherein the mechanism configured to perform texture analysis comprises:
  a mechanism configured to determine a trabecular orientation for the image data within the ROI, said at least one measure of bone structure including the trabecular orientation.

54. The system of claim 46, further comprising:
  a mechanism configured to predict the likelihood of bone fracture from the estimation of bone strength.

* * * * *